United States Patent
Eitschberger et al.

(10) Patent No.: US 11,434,725 B2
(45) Date of Patent: Sep. 6, 2022

(54) AUTOMATED DRONE DELIVERY SYSTEM

(71) Applicant: DynaEnergetics Europe GmbH, Troisdorf (DE)

(72) Inventors: Christian Eitschberger, Munich (DE); Liam McNelis, Bonn (DE)

(73) Assignee: DynaEnergetics Europe GmbH, Troisdorf (DE)

( * ) Notice: Subject to any disclaimer, the term of this patent is extended or adjusted under 35 U.S.C. 154(b) by 0 days.

(21) Appl. No.: 17/608,173

(22) PCT Filed: Jun. 2, 2020

(86) PCT No.: PCT/EP2020/065180
§ 371 (c)(1),
(2) Date: Nov. 2, 2021

(87) PCT Pub. No.: WO2020/254099
PCT Pub. Date: Dec. 24, 2020

(65) Prior Publication Data
US 2022/0145729 A1    May 12, 2022

Related U.S. Application Data

(60) Provisional application No. 62/940,480, filed on Nov. 26, 2019, provisional application No. 62/862,806, filed on Jun. 18, 2019.

(51) Int. Cl.
*E21B 23/10* (2006.01)
*E21B 33/068* (2006.01)
(Continued)

(52) U.S. Cl.
CPC .............. *E21B 41/00* (2013.01); *E21B 23/10* (2013.01); *E21B 33/068* (2013.01); *E21B 34/02* (2013.01); *B65G 47/90* (2013.01); *E21B 43/117* (2013.01)

(58) Field of Classification Search
CPC ........ E21B 41/00; E21B 23/10; E21B 33/068; E21B 34/02; E21B 23/08; E21B 43/119
See application file for complete search history.

(56) References Cited

U.S. PATENT DOCUMENTS

| | | |
|---|---|---|
| 2,713,909 A | 7/1955 | Baker |
| 2,755,863 A | 7/1956 | Stansbury et al. |
| (Continued) | | |

FOREIGN PATENT DOCUMENTS

| | | |
|---|---|---|
| CA | 2833722 A1 | 5/2014 |
| CN | 201546707 U | 8/2010 |
| (Continued) | | |

OTHER PUBLICATIONS

International Searching Authority; International Preliminary Report on Patentability of the International Searching Authority for PCT/EP2020/065180; dated Dec. 21, 2021; 7 pages.
(Continued)

*Primary Examiner* — Daniel P Stephenson
(74) *Attorney, Agent, or Firm* — Moyles IP, LLC

(57) ABSTRACT

A drone conveyance system and a wellhead receiver for deploying drones into a wellbore is described. The system includes a platform, a drone magazine, a platform receiver, a conveyance, and a wellhead receiver. The wellhead receiver prepares the drone to be inserted into the wellbore via the wellhead. Preparation of the drone may include adjusting the physical conditions surrounding the drone to approximate the physical conditions in the wellbore, which may be done with fluid inputs and outputs connected to a compartment of the wellhead receiver. Other preparation processes may also take place in the wellhead receiver, such as assuring the appropriate drone is being inserted, that the
(Continued)

drone has been programmed appropriately, that safety devices have been deactivated and charging an onboard power supply of the drone.

19 Claims, 16 Drawing Sheets

(51) Int. Cl.
*E21B 34/02* (2006.01)
*E21B 41/00* (2006.01)
*B65G 47/90* (2006.01)
*E21B 43/117* (2006.01)

(56) References Cited

U.S. PATENT DOCUMENTS

| | | |
|---|---|---|
| 3,493,061 A | 2/1970 | Gyongyosi |
| 4,479,584 A | 10/1984 | Raz |
| 6,044,905 A | 4/2000 | Harrison, III |
| 6,056,058 A | 5/2000 | Gonzalez |
| 6,182,765 B1 | 2/2001 | Kilgore |
| 6,269,875 B1 | 8/2001 | Harrison, III et al. |
| 6,454,011 B1 | 9/2002 | Schempf et al. |
| 6,457,526 B1 | 10/2002 | Dailey |
| 6,474,931 B1 | 11/2002 | Austin et al. |
| 6,488,093 B2 | 12/2002 | Moss |
| 6,659,180 B2 | 12/2003 | Moss |
| 6,705,414 B2 | 3/2004 | Simpson et al. |
| 6,808,021 B2 | 10/2004 | Zimmerman et al. |
| 7,018,164 B2 | 3/2006 | Anthis et al. |
| 7,036,598 B2 | 5/2006 | Skjærseth et al. |
| 7,140,453 B2 | 11/2006 | Ayling |
| 7,234,525 B2 | 6/2007 | Alves et al. |
| 7,240,742 B2 | 7/2007 | Sewell et al. |
| 7,331,394 B2 | 2/2008 | Edwards et al. |
| 7,631,704 B2 | 12/2009 | Hagemeyer et al. |
| 8,006,765 B2 | 8/2011 | Richards et al. |
| 8,136,585 B2 | 3/2012 | Cherewyk |
| 8,317,448 B2 | 11/2012 | Hankins et al. |
| 8,899,322 B2 | 12/2014 | Cresswell et al. |
| 8,950,480 B1 | 2/2015 | Strickland |
| 9,617,814 B2 | 4/2017 | Seals et al. |
| 9,617,829 B2 | 4/2017 | Dale et al. |
| 9,797,238 B2 | 10/2017 | Frosell et al. |
| 9,903,192 B2 | 2/2018 | Entchev et al. |
| 10,246,952 B2 | 4/2019 | Trydal et al. |
| 10,323,484 B2 | 6/2019 | Liess |
| 10,358,880 B2 | 7/2019 | Metcalf et al. |
| 10,584,552 B2 | 3/2020 | Cannon et al. |
| 10,597,956 B2 | 3/2020 | Gaska et al. |
| 10,598,002 B2 | 3/2020 | Sites |
| 10,605,037 B2 | 3/2020 | Eitschberger et al. |
| 10,612,332 B1 | 4/2020 | Sage |
| 10,844,684 B2 | 11/2020 | Eitschberger |
| 11,047,189 B2 | 6/2021 | Fernandes et al. |
| 2002/0036101 A1 | 3/2002 | Huhdanmaki et al. |
| 2002/0040783 A1 | 4/2002 | Zimmerman et al. |
| 2002/0129941 A1 | 9/2002 | Alves et al. |
| 2002/0134552 A1 | 9/2002 | Moss |
| 2002/0145423 A1 | 10/2002 | Yoo |
| 2004/0094305 A1 | 5/2004 | Skjærseth et al. |
| 2005/0011645 A1 | 1/2005 | Aronstam et al. |
| 2005/0103526 A1 | 5/2005 | Ayling |
| 2005/0217844 A1 | 10/2005 | Edwards et al. |
| 2006/0054326 A1 | 3/2006 | Alves et al. |
| 2008/0223587 A1 | 9/2008 | Cherewyk |
| 2009/0211760 A1 | 8/2009 | Richards et al. |
| 2009/0255728 A1 | 10/2009 | Spencer et al. |
| 2009/0308589 A1 | 12/2009 | Bruins et al. |
| 2010/0288496 A1 | 11/2010 | Cherewyk |
| 2011/0005777 A1 | 1/2011 | Meff |
| 2013/0062055 A1 | 3/2013 | Tolman et al. |
| 2013/0228326 A1 | 9/2013 | Griffith et al. |
| 2014/0083774 A1 | 3/2014 | Hoult et al. |
| 2014/0131035 A1 | 5/2014 | Entchev et al. |
| 2014/0360720 A1 | 12/2014 | Corbeil |
| 2015/0114626 A1 | 4/2015 | Hatten et al. |
| 2015/0167410 A1 | 6/2015 | Garber et al. |
| 2015/0209954 A1 | 7/2015 | Hokanson |
| 2016/0115741 A1 | 4/2016 | Davis |
| 2016/0215592 A1 | 7/2016 | Helms et al. |
| 2017/0044875 A1* | 2/2017 | Hebebrand ......... E21B 41/0092 |
| 2017/0067303 A1 | 3/2017 | Thiemann et al. |
| 2017/0067320 A1 | 3/2017 | Zouhair et al. |
| 2017/0159379 A1 | 6/2017 | Metcalf et al. |
| 2017/0175488 A1 | 6/2017 | Lisowski et al. |
| 2017/0204687 A1 | 7/2017 | Yorga et al. |
| 2017/0306710 A1 | 10/2017 | Trydal et al. |
| 2017/0314372 A1 | 11/2017 | Tolman et al. |
| 2018/0002999 A1 | 1/2018 | Johnson |
| 2018/0003038 A1 | 1/2018 | Cherewyk |
| 2018/0313182 A1 | 11/2018 | Cherewyk et al. |
| 2018/0355674 A1 | 12/2018 | Cooper et al. |
| 2019/0031307 A1 | 1/2019 | Siersdorfer |
| 2019/0186211 A1 | 6/2019 | Gonzalez |
| 2019/0218880 A1 | 7/2019 | Cannon et al. |
| 2019/0316449 A1 | 10/2019 | Schultz et al. |
| 2019/0330933 A1 | 10/2019 | Mikalsen |
| 2019/0330935 A1 | 10/2019 | Mikalsen et al. |
| 2019/0330936 A1 | 10/2019 | Mikalsen et al. |
| 2019/0330937 A1 | 10/2019 | Mikalsen |
| 2019/0338606 A1 | 11/2019 | Metcalf et al. |
| 2019/0368301 A1 | 12/2019 | Eitschberger et al. |
| 2020/0056442 A1 | 2/2020 | Cherewyk et al. |
| 2020/0157909 A1 | 5/2020 | Fernandes et al. |
| 2021/0040809 A1 | 2/2021 | Eitschberger |
| 2021/0123330 A1 | 4/2021 | Eitschberger et al. |

FOREIGN PATENT DOCUMENTS

| | | | |
|---|---|---|---|
| CN | 204430910 U | 7/2015 | |
| DE | 10341437 A1 | 4/2005 | |
| DE | 10344523 A1 | 4/2005 | |
| EP | 2310616 B1 | 10/2017 | |
| GB | 2457081 A | 8/2009 | |
| RU | 2561828 C2 | 9/2015 | |
| WO | 0133029 A3 | 5/2001 | |
| WO | 0133029 A2 | 12/2001 | |
| WO | 2015081092 A2 | 6/2015 | |
| WO | 2018094220 A1 | 5/2018 | |
| WO | 2019033183 A1 | 2/2019 | |
| WO | 2019229520 A1 | 12/2019 | |
| WO | 2019229521 A1 | 12/2019 | |
| WO | 2020002983 A1 | 1/2020 | |
| WO | 2020254099 A1 | 12/2020 | |
| WO | WO-2020254099 A1 * | 12/2020 | ............ E21B 23/10 |

OTHER PUBLICATIONS

United States Patent and Trademark Office; Advisory Action Before the Filing of an Appeal Brief for U.S. Appl. No. 16/537,720; dated Dec. 27, 2021; 3 pages.
United States Patent and Trademark Office; Non-Final Office Action for U.S. Appl. No. 17/254,198; dated Dec. 22, 2021; 17 pages.
Entchev et al., "Autonomous Perforating System for Multizone Completions," SPE 147296, Prepared for Presentation at Society of Petroleum Engineers (SPE) Annual Technical Conference and Exhibition held Oct. 30, 2011-Nov. 2, 2011, 7 pgs.
Entchev et al., Autonomous Perforating System for Multizone Completions, SPE International, 2011, 7 pgs., https://www.onepetro.org/conference-paper/SPE-147296-MS.
International Searchiing Authority, International Search Report and Written Opinion of International App. No. PCT/EP2019/063966, dated Aug. 30, 2019, 10 pages.
International Searching Authority, International Search Report and Written Opinion for PCT App. No PCT/IB2019/000526; dated Sep. 25, 2019, 17 pgs.
International Searching Authority, International Search Report and Written Opinion for PCT App. No PCT/IB2019/000530; dated Oct. 8, 2019; 13 pgs.

(56) References Cited

OTHER PUBLICATIONS

International Searching Authority, The International Search Report and Written Opinion of International App. No. PCT/IB2019/000537, dated Sep. 25, 2019, 18 pgs.
International Searching Authority; Communication Relating to the Results of the Partial International Search for PCT/EP2020/070291; dated Oct. 20, 2020; 8 pages.
International Searching Authority; International Preliminary Report on Patentability for International Application No. PCT/IB2019/000526; dated Dec. 10, 2020; 10 pages.
International Searching Authority; International Preliminary Report on Patentability for International Application No. PCT/IB2019/000537; dated Dec. 10, 2020; 11 pages.
International Searching Authority; International Preliminary Report on Patentability for PCT/EP2019/066919; dated Jan. 7, 2021; 9 pages.
International Searching Authority; International Preliminary Report on Patentability for PCT/B2019/000530; dated Jan. 7, 2021; 9 pages.
International Searching Authority; International Preliminary Report on Patentability International Application No. PCT/EP2019/063966; dated Dec. 10, 2020; 7 pages.
International Searching Authority; International Preliminary Report on Patentability of the International Searching Authority for PCT/EP2019/072032; dated Mar. 4, 2021; 9 pages.
International Searching Authority; International Preliminary Report on Patentability of the International Searching Authority for PCT/EP2019/072064; dated Feb. 25, 2021; 9 pages.
International Searching Authority; International Search Report and Written Opinion for PCT App. No. PCT/EP2019/066919; dated Sep. 10, 2019; 11 pages.
International Searching Authority; International Search Report and Written Opinion for PCT App. No. PCT/EP2019/072032; dated Nov. 15, 2019; 13 pages.
International Searching Authority; International Search Report and Written Opinion for PCT App. No. PCT/EP2019/072064; dated Nov. 20, 2019; 15 pages.
International Searching Authority; International Search Report and Written Opinion for PCT Appl PCT/EP2020/065180; dated Oct. 6, 2020; 11 pages.
International Searching Authority; International Search Report and Written Opinion of the International Searching Authority for PCT/EP2020/070291; dated Dec. 15, 2020; 14 pages.
International Searching Authority; International Search Report and Written Opinion of the International Searching Authority for PCT/EP2020/075788; dated Mar. 16, 2021; 17 pages.
International Searching Authority; Invitation to Pay Additional Fees with Partial International Search for Application No. PCT/EP2020/075788; dated Jan. 19, 2021; 9 pages.
United States Patent and Trademark Office, Final Office Action of U.S. Appl. No. 16/423,230, dated Nov. 4, 2019, 14 pages.
United States Patent and Trademark Office, Final Office Action of U.S. Appl. No. 16/542,890, dated May 12, 2020, 16 pages.
United States Patent and Trademark Office, Non-Final Office Action of U.S. Appl. No. 16/451,440, dated Oct. 24, 2019, 22 pages.
United States Patent and Trademark Office, Non-Final Office Action of U.S. Appl. No. 16/423,230, dated Aug. 27, 2019, 16 pages.
United States Patent and Trademark Office, Non-Final Office Action of U.S. Appl. No. 16/788,107, dated Apr. 6, 2020, 15 pages.
United States Patent and Trademark Office, Notice of Allowance for U.S. Appl. No. 16/423,230, dated Nov. 27, 2019, 7 pages.
United States Patent and Trademark Office, Notice of Allowance for U.S. Appl. No. 16/788,107, dated Jul. 30, 2020, 9 pages.
United States Patent and Trademark Office; Final Office Action for U.S. Appl. No. 16/451,440; dated Feb. 7, 2020; 11 pages.
United States Patent and Trademark Office; Non-Final Office Action for U.S. Appl. No. 16/542,890; dated Nov. 4, 2019; 16 pages.
United States Patent and Trademark Office; Non-Final Office Action for U.S. Appl. No. 16/537,720; dated Jun. 15, 2021; 13 pages.
United States Patent and Trademark Office; Non-Final Office Action for U.S. Appl. No. 16/542,890, filed Sep. 30, 2020; 17 pages.
United States Patent and Trademark Office; Notice of Allowance for U.S. Appl. No. 16/451,440; dated Jun. 5, 2020; 8 pages.
United States Patent and Trademark Office; Requirement for Restriction/Election for U.S. Appl. No. 16/537,720; dated Apr. 27, 2021; 8 pages.
United States Patent and Trademark Office; Final Office Action for U.S. Appl. No. 17/254,198; dated May 26, 2022; 19 pages.
United States Patent and Trademark Office; Non-Final Office Action for U.S. Appl. No. 17/072,067; dated Mar. 31, 2022; 15 pages.

* cited by examiner

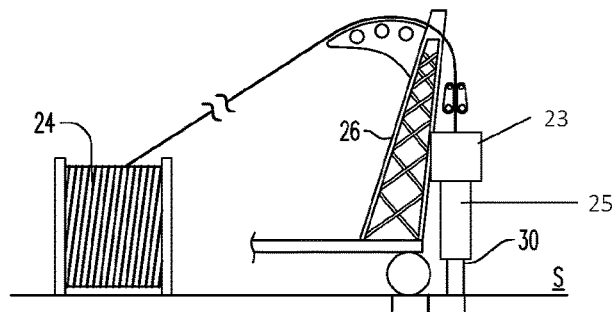
FIG. 1
(PRIOR ART)
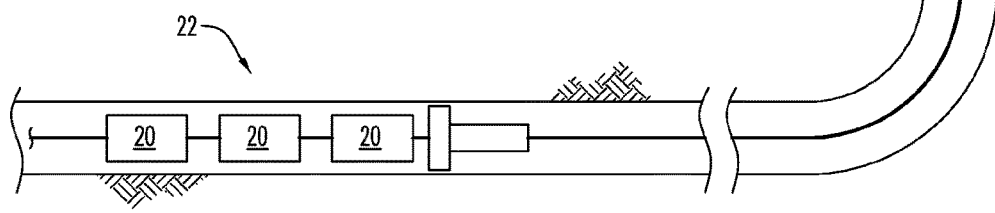
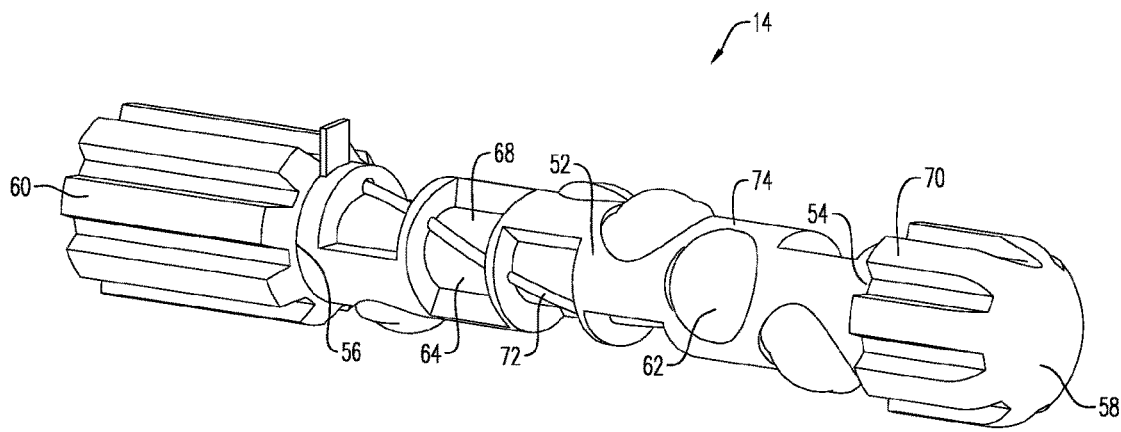
FIG. 2

AUTOMATED DRONE DELIVERY SYSTEM

CROSS-REFERENCE TO RELATED APPLICATIONS

This application is a national stage application of and claims priority to Patent Cooperation Treaty (PCT) Application No. PCT/EP2020/065180 filed Jun. 2, 2020, which claims the benefit of U.S. Provisional Application No. 62/940,480 filed Nov. 26, 2019 and U.S. Provisional Application No. 62/862,806 filed Jun. 18, 2019, each of which is incorporated herein by reference in its entirety.

FIELD OF THE INVENTION

The present invention relates to a method and apparatus for handling, moving and inserting tools, including tools in the form of untethered drones, into a pressurized wellbore.

BACKGROUND OF THE DISCLOSURE

Oil and gas reserves are accessed using various drilling and completion techniques. The drilling techniques require preparation of a drilling site by the formation of a wellbore 50, as illustrated in FIG. 1. A wellbore 50 is a narrow shaft drilled in the ground, vertically and/or horizontally as well as angles therebetween. A wellbore 50 can include a substantially vertical portion and a substantially horizontal portion and a typical wellbore 50 may be over a mile in depth, the vertical portion, and several miles in length, the horizontal portion.

A tool 20 or tool string 22 is typically introduced into a wellbore 50 by attaching a lubricator 23 to a blowout preventer 25 at the wellhead 30 of a well casing. The lubricator 23 is a series of large diameter tubular members assembled on top of wellhead 30 and may include a grease injection tube and/or stuffing box through which a wireline 24 for suspending the tool is passed. Pressure between the wellbore 50 and lubricator 23 is equalized by valves around the blowout preventer 25.

A wireline, electric line or e-line 24 is cabling technology used to lower and retrieve tools 20 into and out of the wellbore 50 of the oil or gas well for the purpose of delivering an explosive charge, evaluation of the wellbore 50 or other completion-related or closure-related tasks. The equipment/devices disposed in the wellbore 50 are often generically referred to as downhole tools 20 and examples of such tools 20 are perforating guns, puncher guns, logging tools, jet cutters, plugs, frac plugs, bridge plugs, setting tools, self-setting bridge plugs, self-setting frac plugs, mapping/positioning/orientating tools, bailer/dump bailer tools and ballistic tools. Such downhole tools 20 are typically attached to a wireline 24 (i.e., an electric cable or eline), fed through or run inside the casing or tubing, and are lowered into the wellbore 50. Other methods include tubing conveyed (i.e., TCP for perforating) or coil tubing conveyance. A speed of unwinding a wireline cable 24 and winding the wireline cable 24 back up is limited based on a speed of the wireline equipment rig 26 and forces on the wireline cable 24 itself (e.g., friction within the well). Because of these limitations, it typically can take several hours for a wireline cable 24 and the attached tool 20 or tool-string 22 to be lowered into a well and another several hours for the wireline cable 24 to be wound back up and the toolstring 22 retrieved. When detonating explosives, the wireline cable 24 will be used to position and send an electrical signal to a downhole tool 20 or toolstring 22 in the wellbore 50.

This type of deployment process requires the selection of a downhole tool 20, the attachment of that tool 20 or a combination of tools in a toolstring 22 to the wireline 24, and in some instances, the removal of the downhole tool(s) 20 from the wellbore 50. When an operator needs to deploy additional downhole tools 20 into the wellbore 50, which may be the same as or different from previously-deployed tool(s), the operator must first retract/retrieve the wireline 24 from the wellbore 50 and then attach the wireline 24 to the additional downhole tool(s) 20. That is, no practical means exists for disposing more than one wireline 24 into a wellbore 50 during typical operations. This completion process requires multiple steps, a significant array of equipment, and can be time consuming and costly. Furthermore, equipment lodged or stuck in the wellbore will typically result in complication, delay, additional human resource time, equipment cost and, often, exorbitant expense to operations.

The various drilling and completion operations requiring deployment of various downhole tools 20 as well as the changing of tools being deployed, currently require direct human interaction with the wireline 24, the tools 20 on the wireline 24 and the feeding of tools/wireline into the equipment attached to the wellhead 30. Wellhead 30 is a general term used to describe the pressure-containing component at the surface of an oil well that provides the interface for drilling, completion, and testing of all subsurface operation phases. Being pressurized and the pressurization subject to an unknown level of variability, in addition to the substantial amount of shifting equipment adjacent the wellhead 30, the area around the wellhead 30 is referred to as a 'red zone'. A red zone typically represents an area within a few yards or rather tens of yards around the wellhead 30 where dangers inherent in drilling and completion operations are highest. During operations, only trained personnel are permitted in the red zone and those personnel must be properly protected. Even then, the activities of attaching and detaching tools 20 from a wireline 24, disposing a wireline 24 and attached toolstring 22 into the wellbore 50 and retrieving a wireline 24 and the attached toolstring 22 from the wellbore 50, are inherently difficult, dirty and dangerous.

In view of the disadvantages associated with currently available devices and methods for well completion, there is a need for a device and method that increases the efficiency of the completion processes. There is a further need for a device and method that reduces the steps, time to achieve steps, time between steps and associated costs and equipment for well completion processes. There is a further need for a system and method that reduces the delay between drilling of a wellbore and production of oil or gas from the wellbore. The system and method need flexibility in accessing the wellbore with the appropriate equipment in a timely and efficient manner. Subsequent to the wellbore being reached with the appropriate equipment, the system and method needs to achieve vertical access to reach the equipment extending vertically above, and providing access to, the wellbore. Also, in light of the dangers of disposing and retrieving tools from a wellbore, there is also a need to reduce or eliminate the number of persons in the red zone 36 adjacent the wellhead, especially during particularly risk prone activities.

BRIEF DESCRIPTION OF THE EXEMPLARY EMBODIMENTS

This disclosure generally describes disbursement, delivery management and deployment systems for devices/downhole tools, including a drone delivery system for conveying a drone into a wellbore. The drone delivery system includes a magazine configured to contain a plurality of the drones and a drone manipulating arm including a drone engagement element configured to connect and disconnect the drone manipulating arm to and from the drone. The drone manipulating arm is configured to remove the drone from the magazine and move the drone from the magazine to a point proximate a wellhead, wherein the wellhead is connected to the wellbore.

Further embodiments are associated with a drone delivery system including a magazine configured to contain a plurality of the drones and a drone manipulating arm supported by a platform. The drone manipulating arm includes a drone engagement element configured to select one of the drones from the magazine and position the drone for insertion into a wellhead receiver. The wellhead receiver is connected to a first wellbore, such that the selected drone can be deployed into the first wellbore.

Additional embodiments are associated with a method for conveying a drone into a first wellbore. The method includes providing a magazine containing a plurality of the drones. One drone of the plurality of drones contained in the magazine is engaged with a drone engagement element of a drone manipulating arm. The method further including removing the drone from the magazine, and placing the drone into a wellhead receiver. The wellhead receiver is connected to the first wellbore, so the drone can be deployed into the first wellbore.

BRIEF DESCRIPTION OF THE DRAWINGS

A more particular description will be rendered by reference to specific embodiments thereof that are illustrated in the appended drawings. Understanding that these drawings depict only typical embodiments thereof and are not therefore to be considered to be limiting of its scope, exemplary embodiments will be described and explained with additional specificity and detail through the use of the accompanying drawings in which:

FIG. 1 is a side, plan view of a prior art system for disposing downhole tools in a wellbore by wireline;

FIG. 2 is a perspective view of a drone specifically configured as a perforating gun;

Figure 2A:
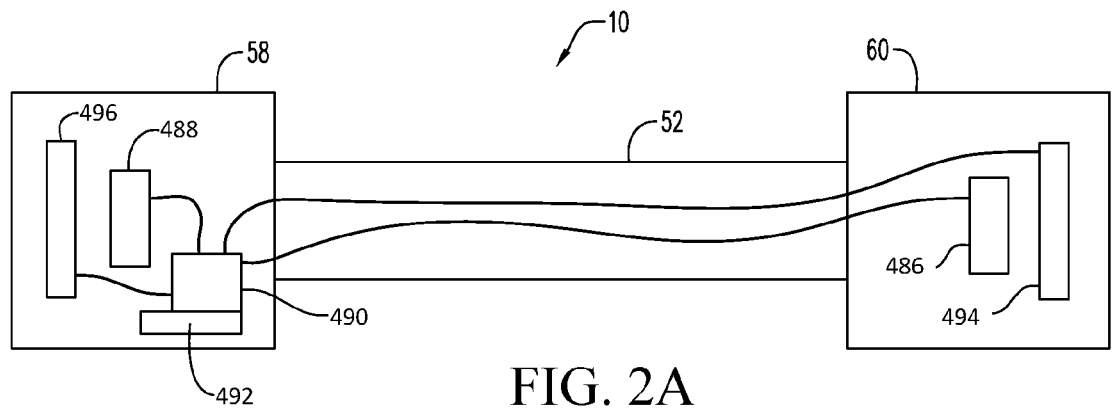
FIG. 2A is a cross-sectional, plan view of a drone according to an embodiment.

Various features, aspects, and advantages of the embodiments will become more apparent from the following detailed description, along with the accompanying figures in which like numerals represent like components throughout the figures and text. The various described features are not necessarily drawn to scale but are drawn to emphasize specific features relevant to some embodiments.

The headings used herein are for organizational purposes only and are not meant to limit the scope of the description or the claims. To facilitate understanding, reference numerals have been used, where possible, to designate like elements common to the figures.

DETAILED DESCRIPTION

Reference will now be made in detail to various embodiments. Each example is provided by way of explanation and is not meant as a limitation and does not constitute a definition of all possible embodiments.

For purposes of illustrating features of the embodiments, embodiments of the disclosure will now be introduced in reference to the figures. Those skilled in the art will recognize that this example is illustrative and not limiting and is provided purely for explanatory purposes.

This application incorporates by reference each of the following patent applications and patents in their entireties: U.S. patent application Ser. No. 16/537,720, filed Aug. 12, 2019; U.S. application Ser. No. 16/451,440, filed Jun. 25, 2019; International Patent Application No. PCT/EP2019/066919, filed Jun. 25, 2019; International Patent Application No. PCT/US2019/063966, filed May 29, 2019; U.S. Pat. No. 10,605,037 issued Mar. 31, 2020; U.S. Provisional Patent Application No. 62/842,329, filed May 2, 2019; U.S. Provisional Patent Application No. 62/841,382, filed May 1, 2019; International Patent Application No. PCT/M2019/000526, filed Apr. 12, 2019; U.S. Provisional Patent Application No. 62/831,215, filed Apr. 9, 2019; International Patent Application No. PCT/IB2019/000530, filed Mar. 29, 2019; U.S. Provisional Patent Application No. 62/823,737, filed Mar. 26, 2019; International Patent Application No. PCT/M2019/000537, filed Mar. 18, 2019; U.S. Provisional Patent Application No. 62/816,649, filed Mar. 11, 2019; U.S. Provisional Patent Application No. 62/720,638, filed Aug. 21, 2018; U.S. Provisional Patent Application No. 62/765,185, filed Aug. 16, 2018; U.S. Provisional Patent Application No. 62/719,816, filed Aug. 20, 2018; U.S. Provisional Patent Application No. 62/690,314, filed Jun. 26, 2018; U.S. Provisional Patent Application No. 62/678,654, filed May 31, 2018; and U.S. Provisional Patent Application No. 62/678,636, filed May 31, 2018.

In general, the embodiments of the disclosure concern the use of one or more drones for well completion operations. As used herein, the term "drone" refers to a downhole tool or toolstring not connected to a physical wire/cable, i.e., the term "drone" refers generally to an untethered drone. Drones are configured for deployment into and use in a wellbore. The drone may be configured to move at pump speed or flow rate speed (i.e., the speed at which fluid is pumped into the wellbore).

Figure 8:
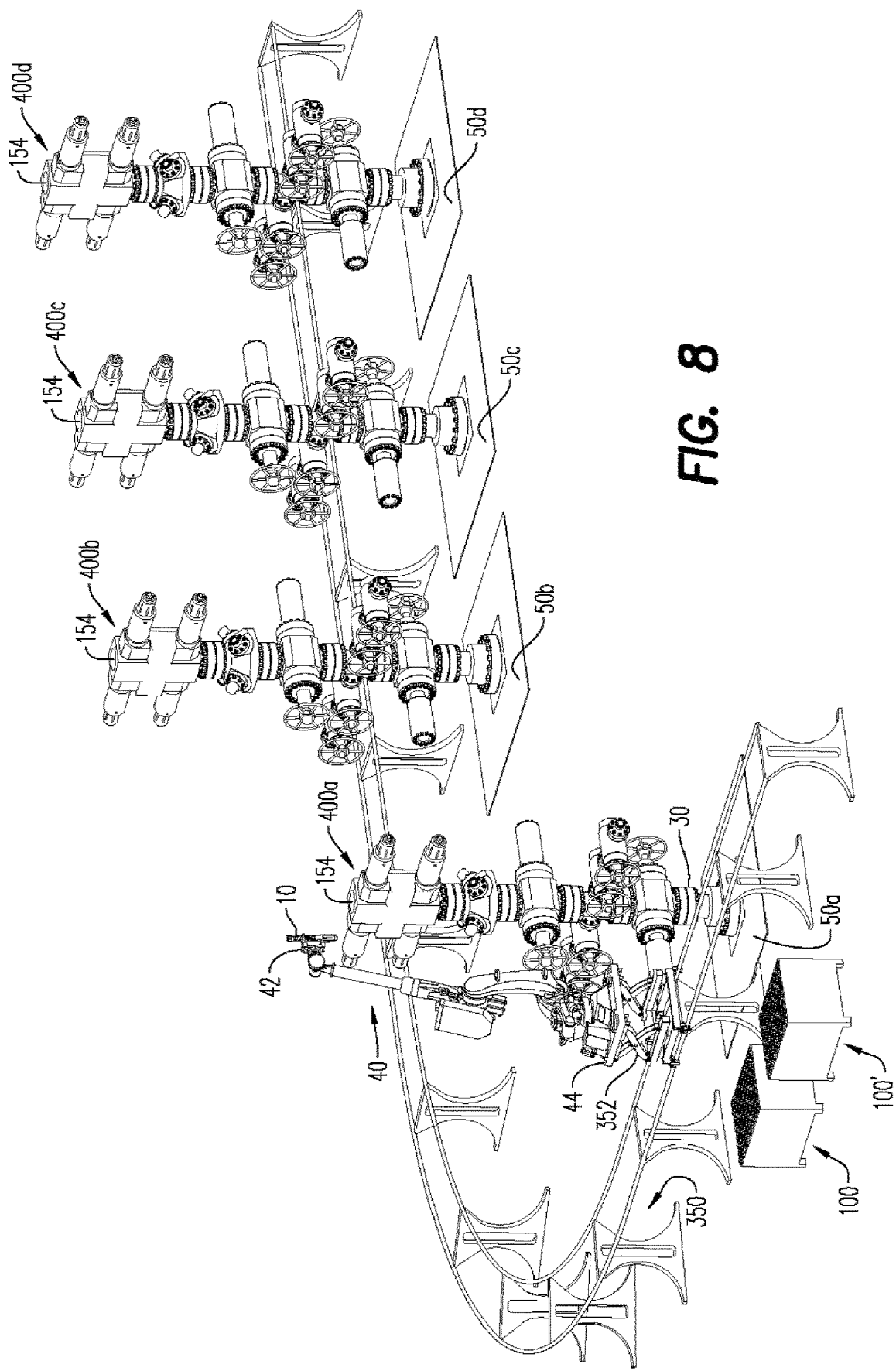
FIG. 8 is a side, perspective view of an embodiment of the system of FIG. 7 wherein the cart and drone manipulating arm are able to access a plurality of wellhead receivers/wellheads.

The present application generally describes various embodiments of a drone delivery system as illustrated, for example, by FIG. 8. Broadly speaking, drone manipulating arm 40 retrieves a drone 10 from a magazine 100 or alternative magazine 100' and delivers the drone 10 into one of a plurality of wellbores 50a, 50b, 50c, 50d. Each wellbore 50 has a wellhead 30 capped by a wellhead receiver 400a, 400b, 400c, 400d. Each wellhead receiver 400 has a drone compartment entrance 154 for receiving a drone 10.

Figure 13:
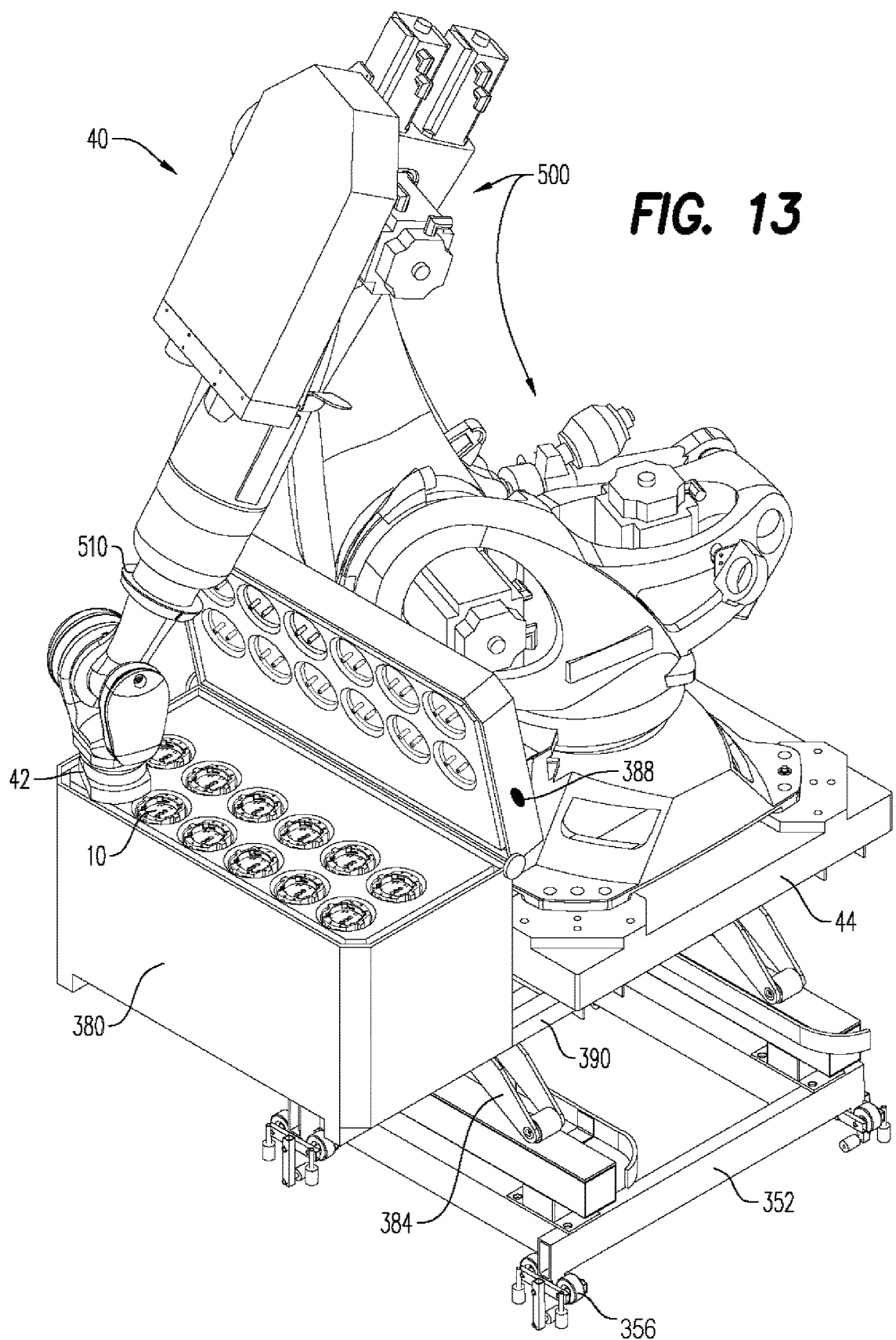
FIG. 13 is a side, perspective view of the embodiment of FIG. 12 where the drone engagement element has been moved to engage a drone in the portable magazine.

The drone manipulating arm 40 has a drone engagement element 42 that is configured to retrieve a drone 10 from the drone magazine 100 and convey the drone 10 into the drone compartment entrance 154 of the selected wellhead receiver 400a, 400b, 400c or 400d. The drone manipulating arm may further include a controller 500 and an elongated portion 510 extending between the controller/control unit 500 and the drone engagement element 42. According to an aspect, the elongated portion 510 may move between a shortened state and a lengthened/extended state to adjust the distance between the controller 500 and the drone engagement element 42. In other words, the drone engagement element 42 may move toward and away from the controller 500 when the elongated portion 510 moves between the shortened and lengthened states, respectively. When the elongated portion 510 is in its extended state (FIG. 7 and FIG. 15), the drone engagement element 42 is able to extend to and reach a height wellhead receiver 400. When the elongated portion is in its shortened state (FIGS. 13-14), or any intermediary position between the shortened state and the extended state, the drone engagement element 42 can retrieve drones from a magazine 380. According to an aspect, the drone manipulating arm 40 is pneumatic.

Figure 6:
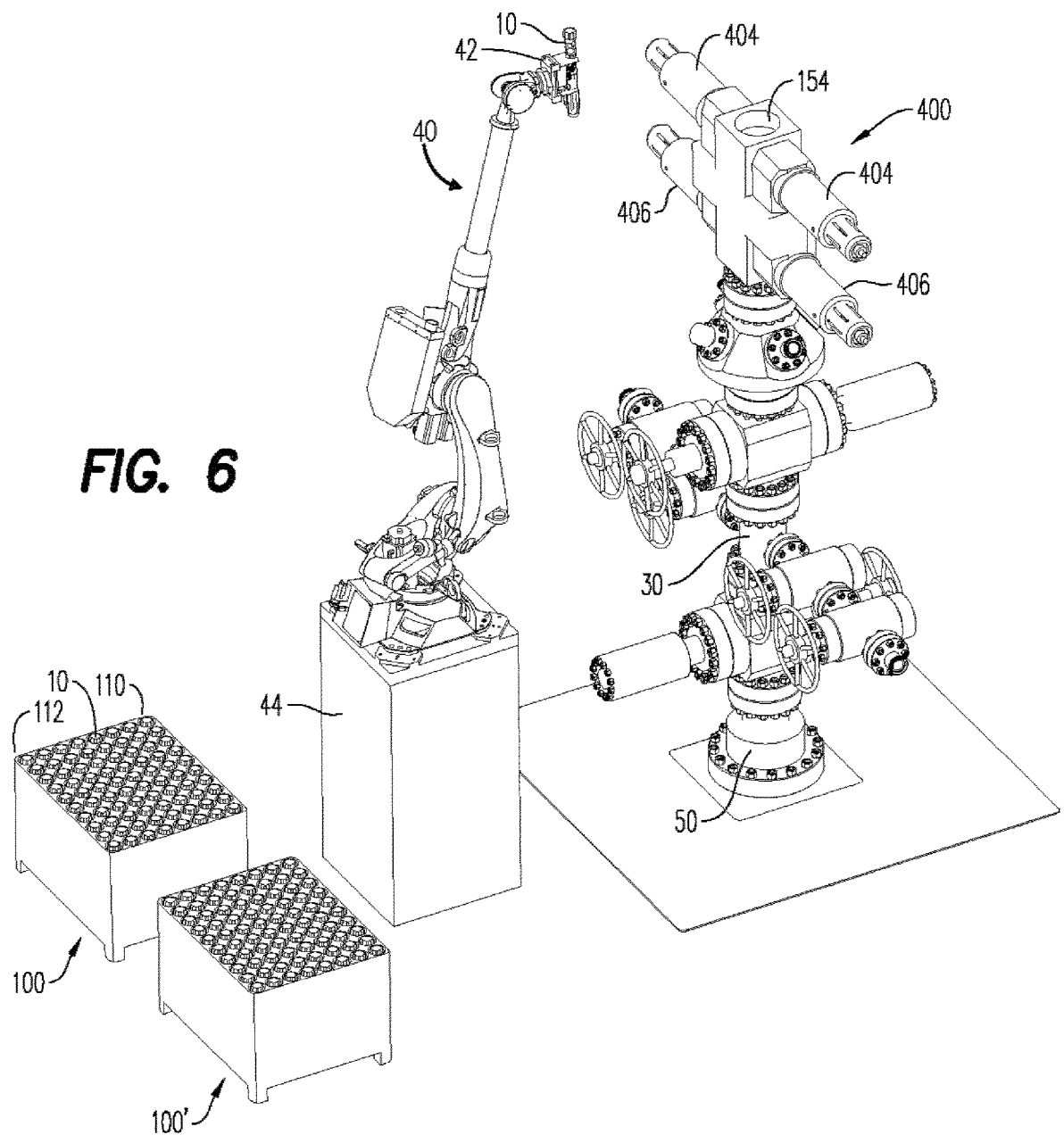
FIG. 6 is a side, perspective view of a drone manipulating arm placed between a pair of drone magazines and a wellhead receiver/wellhead according to an embodiment.
Figure 12:
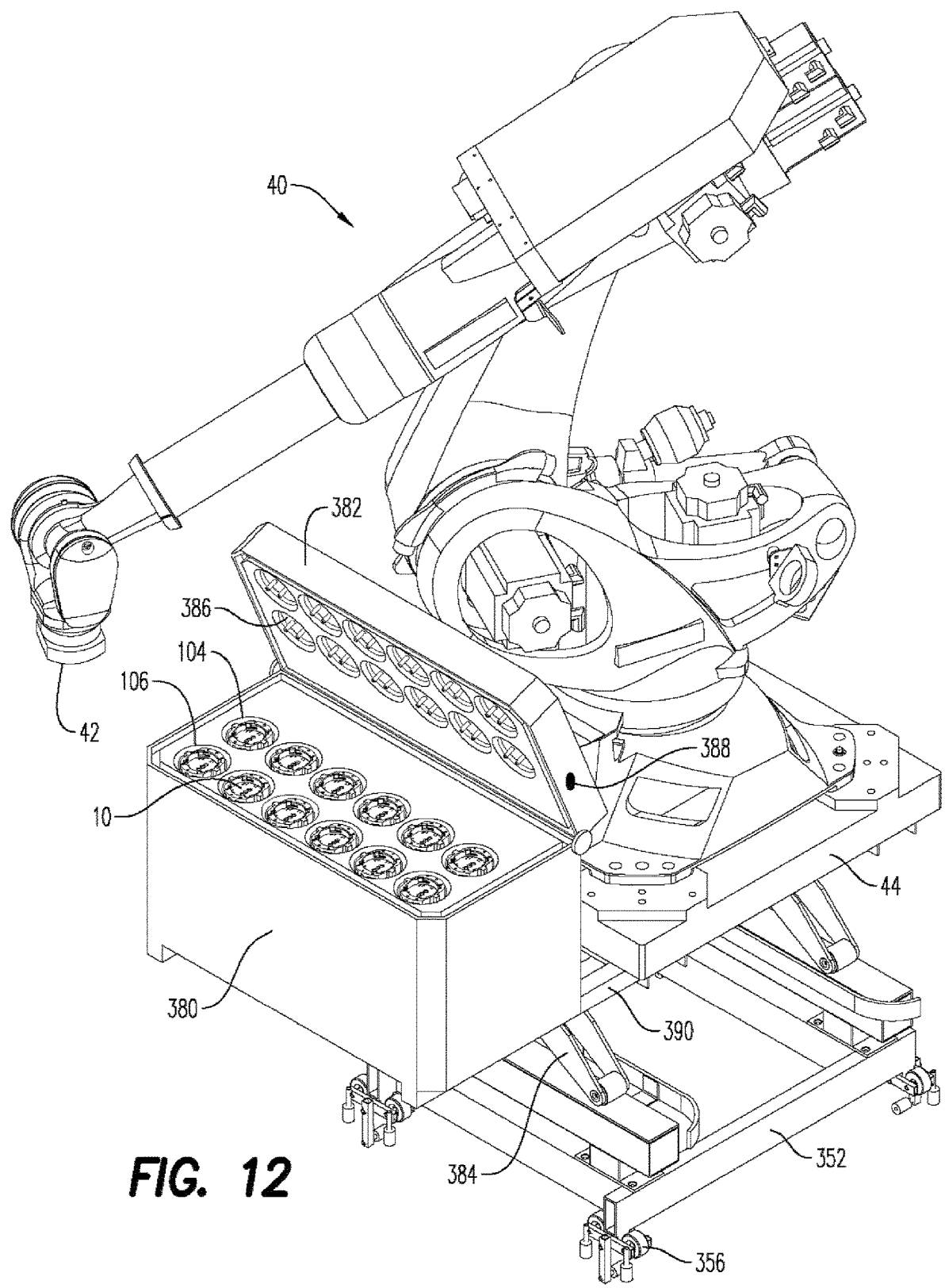
FIG. 12 is a side, perspective view of an embodiment of the drone manipulating arm mounted on a moveable cart and accompanied by a portable magazine.

As shown in FIG. 6, the platform 44 supporting the manipulating arm 40 may be stationary and within 'reach' of both the magazine 100 and the wellhead receiver 400. Alternatively, the platform 44 on which the drone manipulating arm 40 is mounted may be disposed on a moveable cart 352, which may be moved to a point within reach of the drone magazine 100 and, subsequently, moved to a point within reach of any of a number of wellhead receivers 400a, 400b, 400c, 400d. According to an embodiment, the platform 44 may be mounted or otherwise disposed on a scissor lift 384 (FIG. 12), as described in more detail hereinbelow.

The platform 44 and moveable cart 352 may take many forms, e.g., they may be pulled by a vehicle or may be part of a vehicle such as the flat bed of a truck. Alternatively, the moveable cart 352 may be disposed on a rail system 350. However moved, e.g., by way of a truck or rail system 350, the moveable cart 352 permits a single drone manipulating arm 40 to access a plurality of wellhead receivers 400a, 400b, 400c, etc., each attached to a separate wellbore 50a, 50b, 50c, etc. One or more drone magazines 100, 100' may be placed adjacent each wellbore 50. Alternatively, as illustrated in FIGS. 7-11, one or more drone magazines 100, 100' may be centrally located, with the moveable cart 352 and its mounted drone manipulating arm 40 shuttling back-and-forth between the general use magazines 100, 100' and the selected wellbore 50. In either circumstance, the drone magazine(s) may be located either inside or outside the red zone 36, decreasing the need for workmen to enter the red zone 36 and increasing worksite safety, particularly when with the moveable cart 352 and its mounted drone manipulating arm 40 shuttles back-and-forth between the general use magazines 100, 100' and the selected wellbore 50. The improved system allows for a large degree of automation to be utilized in delivering drones 10 to a plurality of wellbores 50 within a given area.

Having reviewed the general layout of an embodiment, specific portions will now be described. With reference to FIG. 2 and FIG. 2A, an exemplary embodiment of a drone is shown. The drone 10 may take the form of a variety of wellbore tools, for example and without limitation, a perforating gun, puncher gun, logging tool, jet cutter, plug, frac plug, bridge plug, setting tool, self-setting bridge plug, self-setting frac plug, mapping/positioning/orientating tool, bailer/dump bailer tool and ballistic tool. The drone illustrated in FIG. 2 is in the configuration of a downhole tool often referred to as a perforating gun 14 (i.e., perforating gun drone). This perforating gun drone includes a body portion 52 having a front end 54 and a rear end 56. A head portion 58 extends from the front end 54 of the body portion 52 and a tail portion 60 extends from the rear end 56 of the body portion 52 in a direction opposite the head portion 58. The body portion 52 includes a plurality of shaped charge apertures 74 and open apertures 64. Each of the plurality of shaped charge apertures 74 are configured for receiving and retaining a shaped charge 62. The body portion 52, the head portion 58 and the tail portion 60 is substantially cylindrically-shaped and may include fins 70. Each of these features is configured with regard to its travel as a drone 10 into a wellbore 50.

FIG. 2A illustrates an embodiment of drone 10 that may represent any type of wellbore tool. Electrical power typically supplied to wellbore tools via a wireline cable 24 would not be available to an untethered drone 10. In order for one or more components of the drone 10 to be supplied with electrical power, a power supply 492 is included as part of the drone 10. The power supply 492 may occupy any portion of the drone 10, i.e., one or more of the body portion 52, the head portion 58 or the tail portion 60. It is contemplated that the power supply 492 may be disposed so that it is adjacent components of the drone 10 that require electrical power. The drone 10 illustrated in FIG. 2A has a processor 490 attached to power supply 492 as well as a number of sensors or other electrically powered components 486, 488, 494 and 496.

Figure 3:
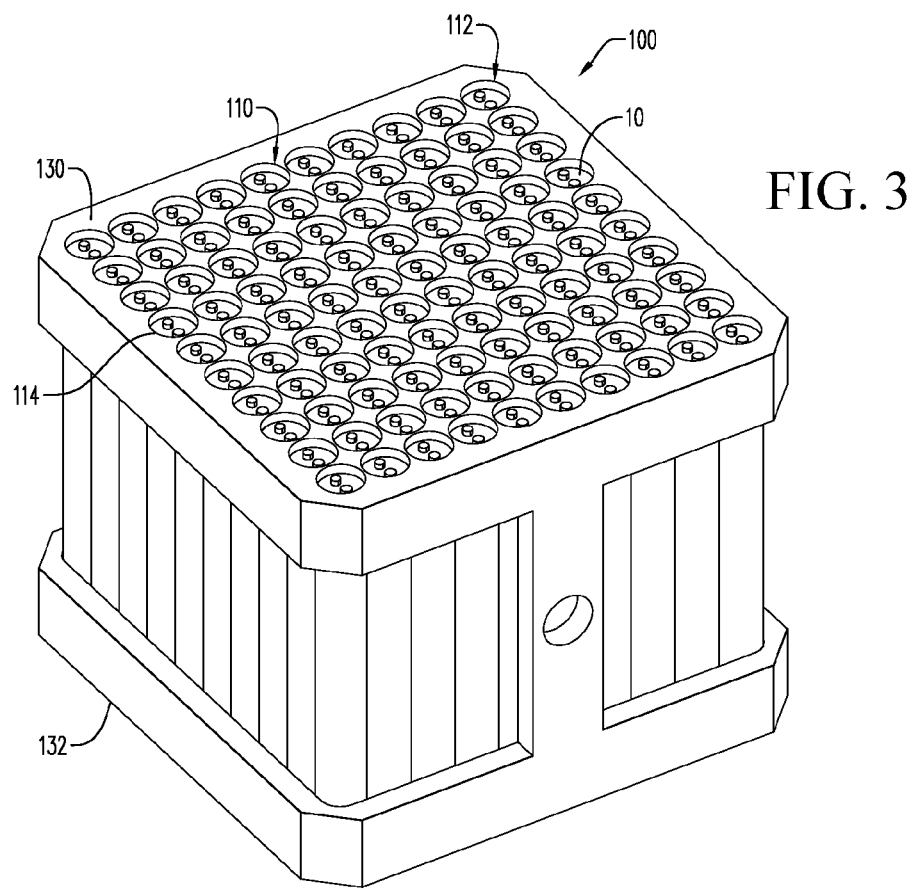
FIG. 3 is a top, perspective view of a drone magazine holding a plurality of drones according to an embodiment.

Turning now to FIG. 3, an embodiment of a magazine 100 capable of containing up to one hundred drones 10 is illustrated. The magazine 100 may include a first section 110 and a second section 112. According to an aspect, the drones in the first section 110 of the magazine 100 may be of same type and the drones in the second section 112 may be of a different type from those in the first section 110. For example, the drones in the first section 110 may be perforating guns while those in the second section 112 may be frac plugs. The sections of the magazine 100 can take many forms. According to an aspect, a multi-section arrangement of the magazine 100 shown in FIG. 3 may have ten sections of ten drones each, with the ten drones arranged in a column.

More than one magazine 100 may be made accessible to the manipulating arm 40, as seen in FIGS. 6-11, with the alternative magazine 100' containing different types of drones than the magazine 100. Thus, merely by way of example, magazine 100 in any one of FIGS. 6-11 may contain perforating gun drones while the magazine 100' may contain frac plug drones. According to an aspect, an operator of the launcher 46 selects which of the magazines 100 dispenses the next drone 10 into the selected wellbore 50. Alternatively, the dispensing of the drone 10 could be pre-configured and automatically dispensed by the control unit 82.

Figure 4:
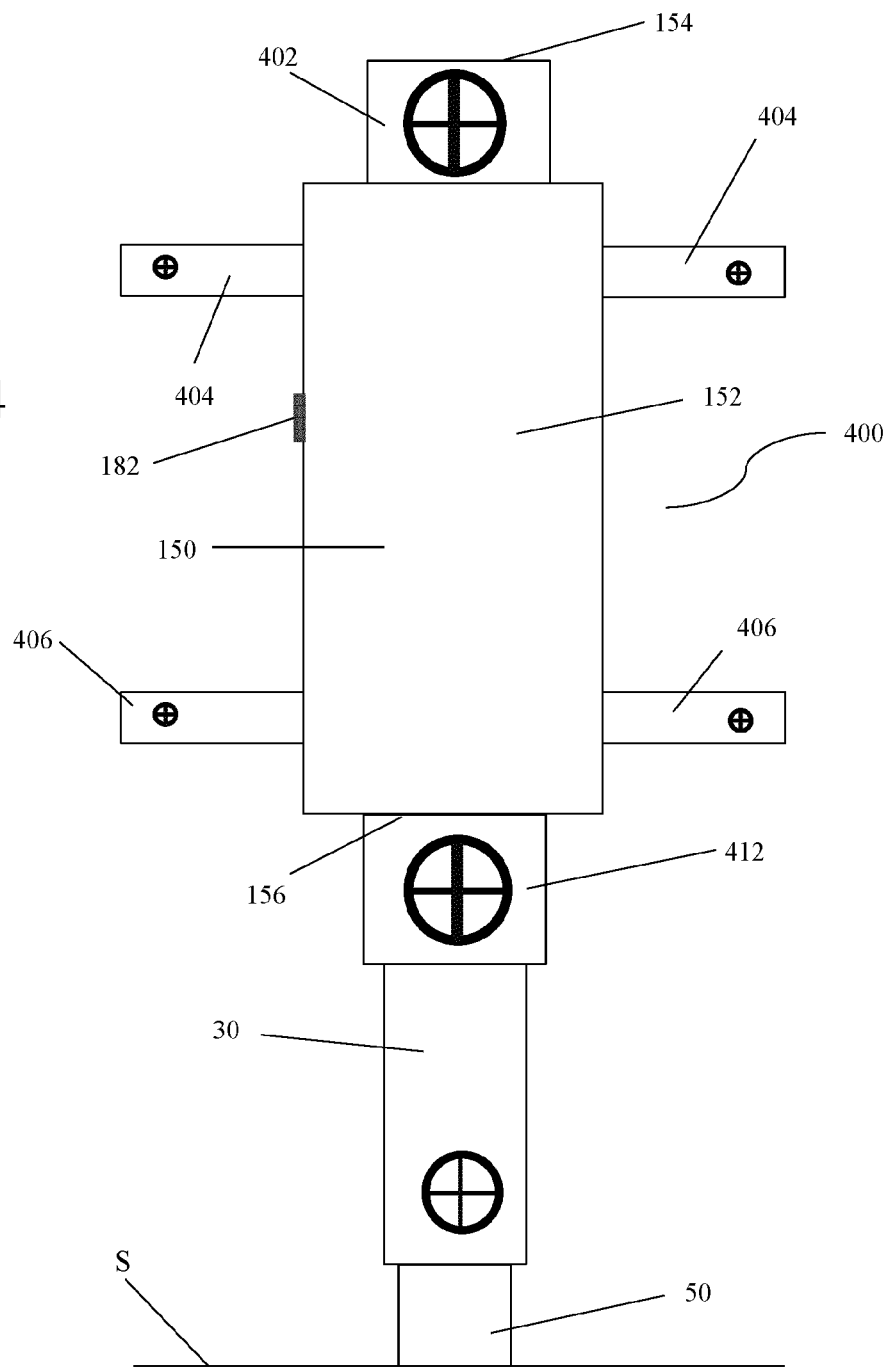
FIG. 4 is a side, plan view of the wellhead receiver according to an embodiment.
Figure 5:
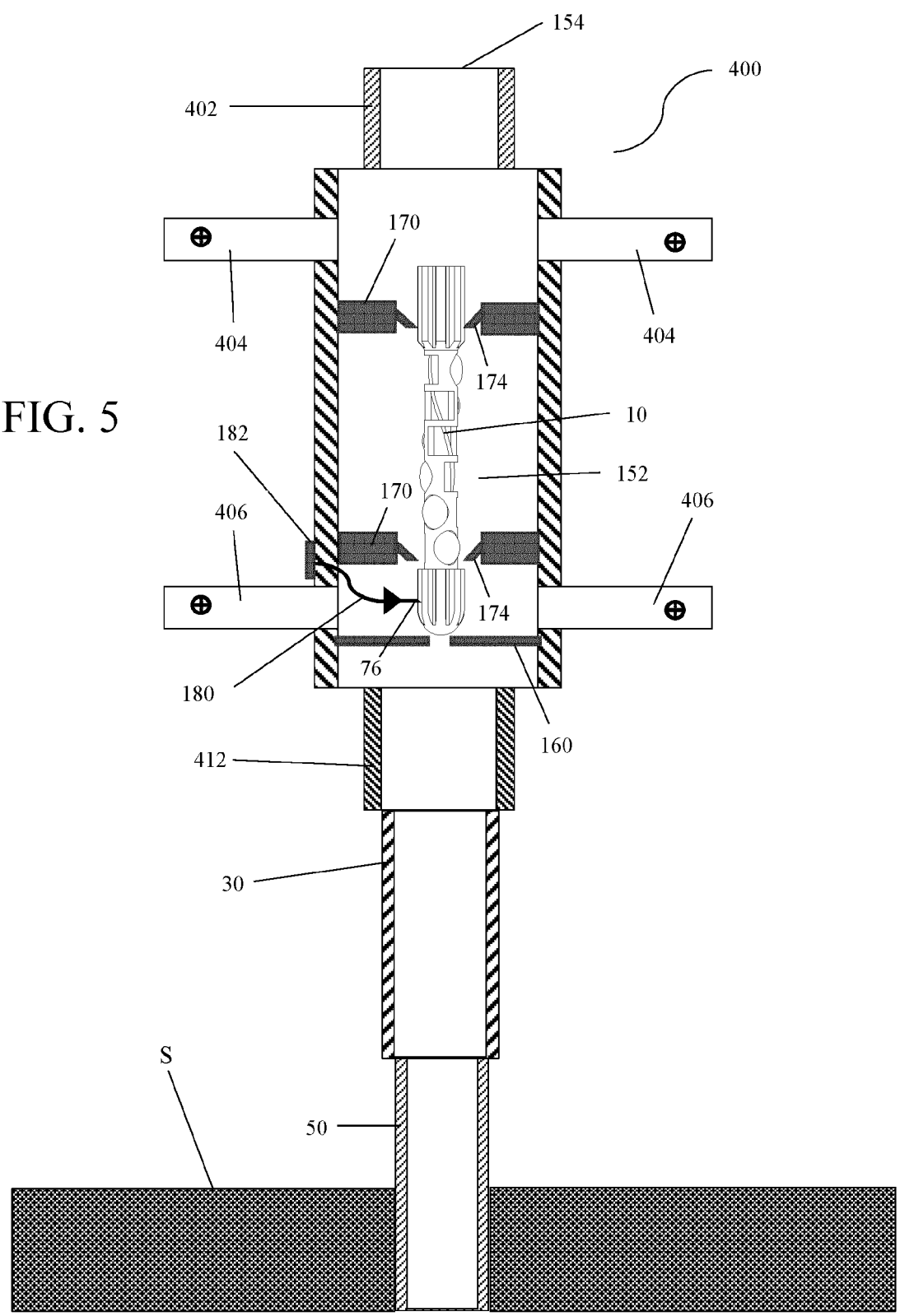
FIG. 5 is a side, cross-sectional plan view of the wellhead receiver shown in FIG. 4 containing a drone in position to be inserted into the wellbore through the wellhead.

FIGS. 4 and 5 illustrate a wellhead launcher 400 for use in receiving and preparing the drone 10 for insertion into the wellbore 50 through the wellhead 30. FIG. 4 generally illustrates the components of the wellhead launcher 400 in accordance with an embodiment. FIG. 5 is a cross-section of the wellhead launcher 400 shown in FIG. 4 and shows the interior portions of the wellhead launcher 400. Most of the functions of wellhead launcher 400 involve the drone 10 occupying the drone compartment 152 thereof.

A drone 10 is inserted into the drone compartment 152, i.e., the hollow interior of casing 150, of the wellhead launcher 400 through a wellhead launcher valve 402. The wellhead launcher valve 402 is disposed between the drone compartment entrance 154 and the drone compartment 152 of the wellhead launcher 400. In an open position, wellhead launcher valve 402 allows insertion of the drone 10 into the hollow casing 150. Once the drone 10 is present in the drone compartment 152 of the wellhead launcher 400, the wellhead launcher valve 402 may be closed so as to seal the wellhead launcher 400 from the external conditions, i.e., atmospheric conditions.

Once the drone 10 is present in a drone compartment 152 of the wellhead launcher 400 and the wellhead launcher valve 402 is closed, the conditions in the drone compartment 152 may be adjusted to the conditions in the wellbore 50. This is a very important step when inserting anything into the wellbore 50 since the conditions in the wellbore 50 may be very different from the conditions elsewhere, e.g., atmospheric. Adjustment of the conditions in the drone compartment may be performed utilizing one or more lubrication inlets 404 and lubrication outlets 406. Although referred to generally as 'lubrication' inlets and outlets, a number of different fluids, e.g., water and air, may be inserted into and removed from the wellhead launcher 400 utilizing these inlets/outlets 404, 406. In addition, each inlet and outlet is, essentially, a valve that can be opened or closed and through which fluid flows based on a pressure differential across the valve.

A launcher valve 412 is located between the drone compartment 152 of the wellhead launcher 400 and the wellhead 30. The launcher valve 412, when closed, seals the wellhead launcher 400 off from the conditions of the wellbore 50. The launcher valve 412 is typically in its closed position whenever wellhead receiver valve 402 is open, e.g., when inserting a drone 10 into the drone compartment 152. With the drone 10 positioned in the drone compartment 152 and both the wellhead receiver valve 402 and the launcher valve 412 closed, the lubricators 404, 406 are operated to expose the drone 10 inside the drone compartment 152 to approximately the conditions of the wellbore 50. Once the conditions in the drone compartment 152 are approximately those of the wellbore 50, the launcher valve 412 may be opened and the drone 10 dropped or pushed through the launcher valve 412 and wellhead 30 into the wellbore 50.

In an embodiment, alternative or supplemental to the launcher valve 412, a drone gate 160 (FIG. 5) may be used to support the drone 10 when it is in the drone compartment 152. The drone gate 160 may be operated to release the drone 10 from the drone compartment when it is desired to insert the drone 10 into the wellbore 50. In the event that the launcher valve 412 is eliminated due to the presence of the drone gate 160, a valve in the wellhead 30 may perform the function of sealing the wellbore 50 off from the drone compartment 152 when necessary.

Depending upon a number of factors, other structures in addition to the drone gate 160 may be provided in the drone compartment to support the drone 10 when, for example, it is being prepared for insertion into the wellbore 50. Such factors may include turbulent conditions that may be present in the drone compartment 152 during various points between the drone 10 being placed in the drone compartment and insertion of the drone into the wellbore 50. One or more drone clamps 170 may extend from an inner wall 158 of the hollow casing 150 of the wellhead launcher 400. These drone clamps 170 may be in the form of annular ring or a plurality of blocks sized to accommodate the drone 10, align it in an appropriate orientation and limit, at least to some degree, its movement inside the drone compartment. Further, in an embodiment, the drone clamps 170 may have clamp wings 174 that extend toward the drone 10 and further aid in stabilizing the drone 10. For example, the clamp wings 174 may prevent the drone from axial movement in the drone compartment 152 caused by turbulence.

Proper positioning of the drone 10 in the drone compartment 152 may also assist with allowing access by an electrical connection 180 in the drone compartment 152 to a connection point 76 on the drone 10. The connection between the connection point 76 on the drone 10 and the electrical connection 180 in the drone compartment 152 may be mechanical, electrical, magnetic, electromagnetic or the like. In an embodiment, the connection point 76 is located on the head 58 of the drone 10. To be sure, the connection point 76 may be on any other position along the length of the drone 10. In the event that the drone 10 contains a power supply 492 and/or an onboard computer 490, the electrical connection 180 may provide either or both charging power and instructions to the drone 10 through the connection point 76. Further, the electronics of the drone 10 may be interrogated through the electrical connection 180 to assess its identity and current status, e.g., current instructions. The drone 10 may include one or more navigational sensors 82 as well as other electronic sensors 84 electrically connected to the computer 80 and power supply 492. Commonly-owned and assigned U.S. application Ser. No. 16/537,720, filed Aug. 12, 2019, which has been incorporated herein by reference in its entirety, describes a drone navigation system suitable for use with the drone 10 described herein.

In an embodiment, the interrogation of the drone 10 may include pre-deployment testing to confirm that the drone 10 satisfies a given set of parameters. The parameters may be set to confirm that the drone 10 will operate as desired in the wellbore 50. The parameters may also be set to confirm that the drone selected is of the correct configuration sought to be next dropped into the wellbore 50. In the event of negative results for the tested parameters, the drone 10 may be removed from the wellhead launcher 400. Alternatively, the drone 10 may be reprogrammed through electrical connection 180. More generally, drone programming, i.e., providing instructions to electronics inside the drone 10, may be accomplished simultaneously with pre-deployment testing. The details of the programming provided to a particular drone 10 will depend upon the type of drone and the details of the job being performed.

FIG. 6 illustrates the interaction between the drone manipulating arm 40, wellhead receiver 400 and magazines 100, 100'. These elements function together to insert a drone 10 into a drone compartment 152 of the wellhead receiver 400, see FIG. 5. The drone manipulating arm 40 is mounted on the platform 44 and has a drone engagement element 42 configured to retrieve a drone 10 from the drone magazine 100 or 100'. The retrieved drone is then conveyed to a point adjacent the drone compartment entrance 154 of the selected wellhead receiver 400a, 400b, 400c or 400d. As shown in FIG. 6, the platform 44 supporting the manipulating arm 40 may be stationary and within 'reach' of both the magazine 100 and the wellhead receiver 400. Alternatively, the platform 44 on which the drone manipulating arm 40 is mounted may be disposed on a moveable cart 352, which may be moved to a point within reach of the drone magazine 100 and, subsequently, moved to another point within reach of any of a number of wellhead receivers 400a, 400b, 400c, 400d.

Figure 7:
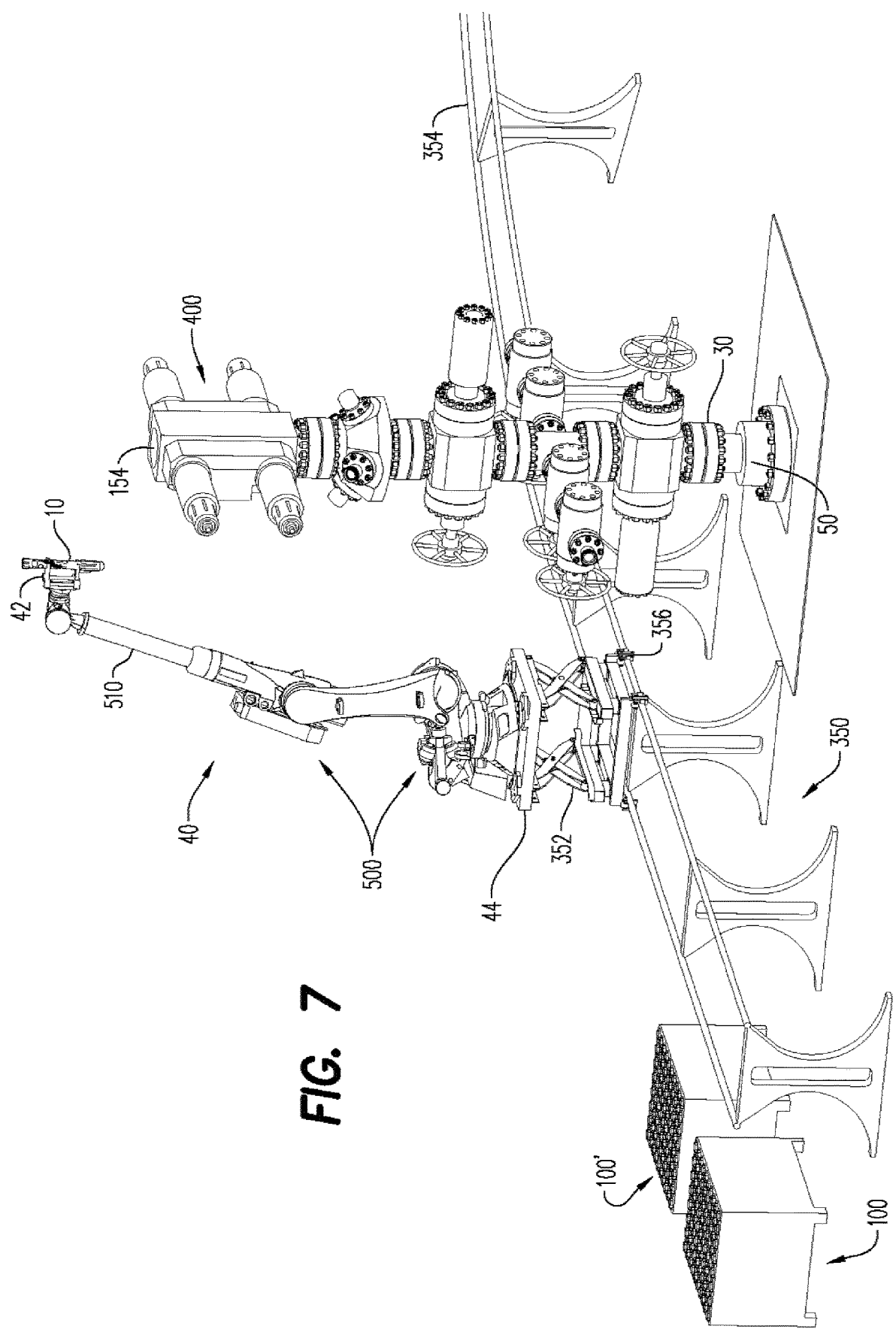
FIG. 7 is a side, perspective view of the drone manipulating arm of FIG. 6 disposed on a cart such that the drone manipulating arm is able to travel on a rail system between the drone magazines and the wellhead receiver/wellhead according to an embodiment.

FIG. 7 illustrates an embodiment where the drone manipulating arm 40 retrieves a drone 10 from a magazine 100 or alternative magazine 100' and is then moved via the cart 352, which it is mounted on wheels 356 that engage rails 354, to deliver the drone 10 into wellbore 50. The wellbore 50 has a wellhead 30 capped by a wellhead receiver 400 with a drone compartment entrance 154 for receiving the drone 10 from the drone engagement element 42 of the drone manipulating arm 40. The moveable cart 352 shown in FIG. 7 is moved along rail system 350.

Figure 9:
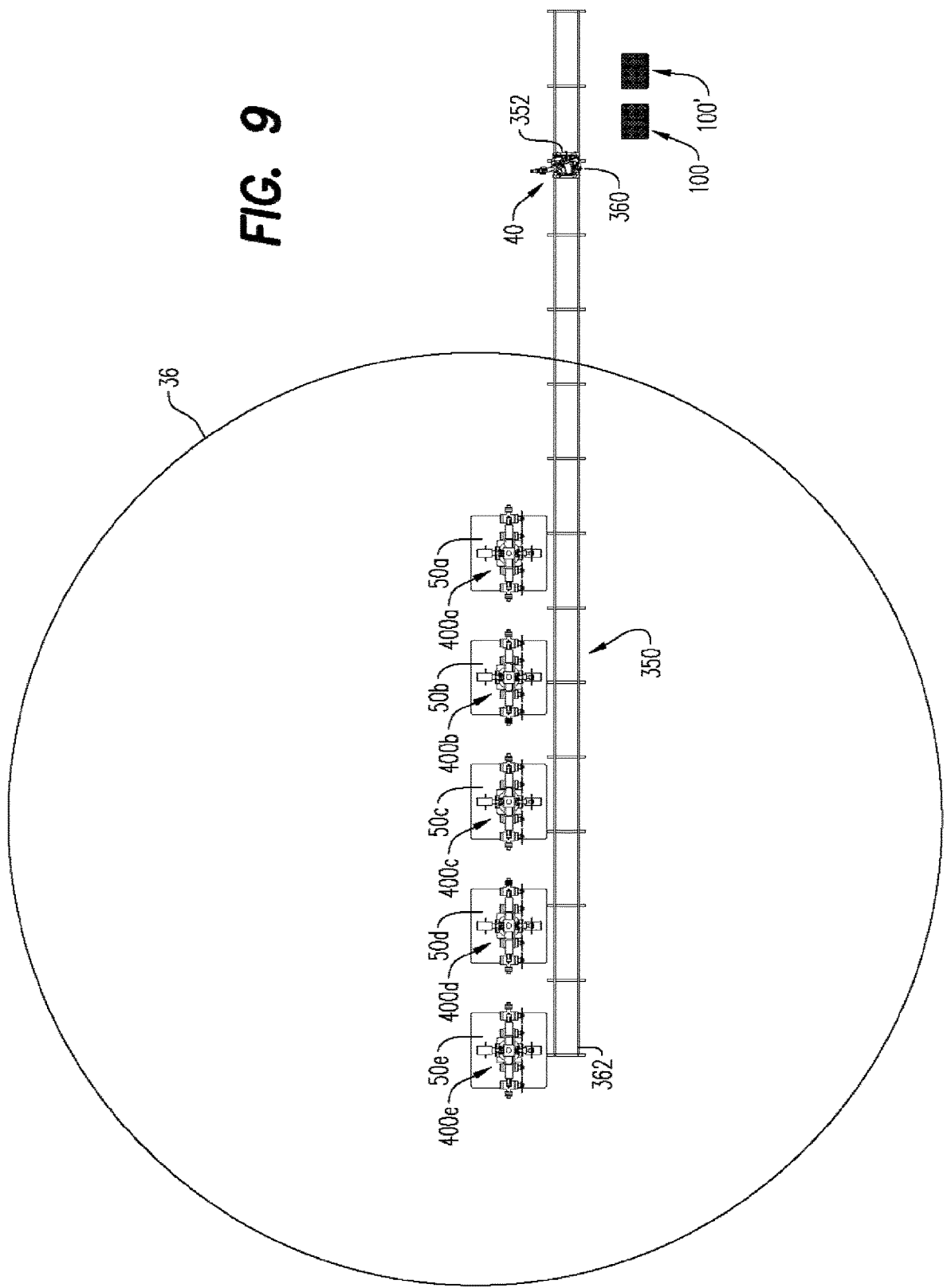
FIG. 9 is a top, plan view of a drone delivery system, illustrating the drone delivery system in a red zone according to an embodiment.

FIG. 9 is an overhead/top view of an embodiment similar to the embodiments of FIG. 7 and FIG. 8. FIG. 9 illustrates the drone delivery system in communication with or at least partially located in a red zone 36. As stated previously, each wellbore 50 is often at higher pressure than the atmosphere. An important purpose of the wellhead 30 and the wellhead receiver 400 may be to establish one or more physical barriers, such as valves, between the wellbore 50 and the atmosphere above the wellbore. In addition, since it is necessary to equalize the pressure around anything to be inserted into the wellbore 50 prior to insertion, the wellhead receiver 400 is constantly being pressurized and depressurized as various devices, e.g., drones, are inserted into the wellbore 50. The equipment used in these and other activities around a wellbore 50 can be dangerous and, often times, only trained operators wearing appropriate safety gear are permitted in the red zone 36. At other times, not even trained operators are permitted in the red zone 36 when certain activities are being performed down in the wellbore 50. Also, even when trained operators wearing safety gear are permitted in the red zone 36, a certain level of risk inherent in oil and gas exploration/extraction always remains. The drone delivery system described herein reduces exposure of operators and other worksite personnel to the high pressure present in any wellbore operation, exposed moving parts of machinery and explosive/pyrotechnic materials used in wellbore operations, among other dangers.

For the embodiments shown in FIGS. 7-9, the magazines 100, 100' my be located at a first position outside the red zone 36. When located at a first position 360 adjacent the magazines 100, 100' the drone manipulating arm 40 disposed on moveable cart 352 is able to select a drone 10 from either magazine. The moveable cart 352, drone manipulating arm 40 and selected drone 10 may then travel to a second position 362 adjacent one of the wellbores 50, at which point the selected drone 10 may be inserted by the drone manipulating arm 40 into the wellbore receiver 400e. The moveable cart 352 can move from the wellbores 50 back to the magazines 100, 100' to retrieve additional drones for deployment into the wellbores 50. Thus, the entire process can be accomplished without any operators entering the red zone 36 and without the yet unused drones in magazines 100, 100' entering the red zone 36.

The embodiment presented in FIG. 6 can serve a similar or slightly modified function with a stationary platform 44 instead of the moveable cart 352. Depending upon the size of the red zone 36, it may still be possible to dispose the magazines 100, 100' outside of the red zone 36. Regardless of the magazines 100, 100' being located in the red zone 36, the system of loading drones 10 presented herein still reduces the number of operators and frequency of operator visits to the red zone 36 and reduces the amount of time, overall, required for human presence in the red zone 36.

Figure 10:
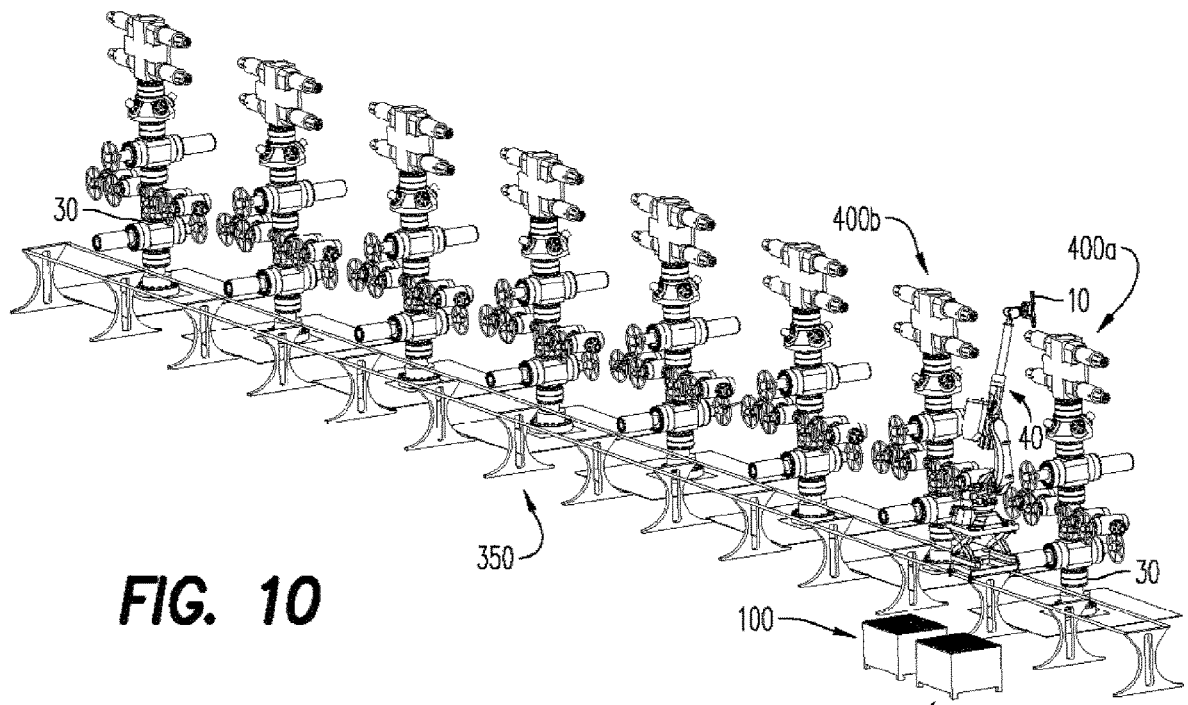
FIG. 10 is a side, perspective view of a drone delivery system including a plurality of drone magazines and a drone manipulating arm, according to an embodiment.
Figure 11:
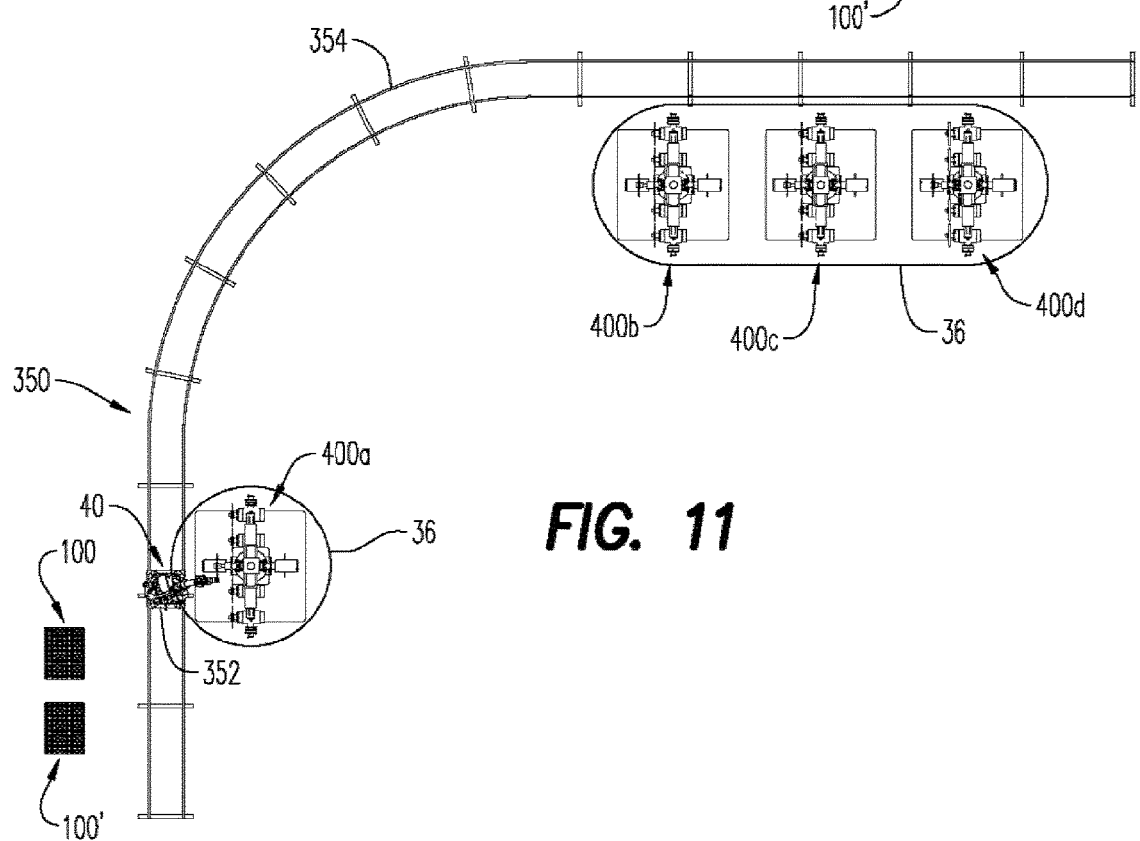
FIG. 11 is a top, plan view of a drone delivery system including wellheads spaced apart from each other and a drone manipulating arm movable between the spaced apart wellheads, according to an embodiment.

FIG. 10 and FIG. illustrate an embodiment having a plurality of wellheads 50 and wellhead receivers 400 that are all accessible by a moveable cart 352 mounted on a rail system 350, as described hereinabove. While the rail system 350 may be arranged in a straight line to service wellheads 50 that are also in a straight line, it is contemplated that the rail system 350 may be adapted to service wellheads that are in various orientations. FIG. 10 illustrates wellheads that are oriented in a substantially straight-line, while FIG. 11 illustrates at least one wellhead that is deviated from the substantially straight-line configuration illustrated in FIG. 10. Because the rail system 350 can be set up in various configurations, such as straight or curved, the moveable cart 352 can travel along any of those configurations as well to service multiple wellheads. For example, FIG. 11 shows an embodiment similar to FIG. 10 from above, with the red zones 36 (at least two red zones 36 spaced apart from each other) denoted.

As noted previously, the electrical power typically supplied via the wireline cable 24 to wellbore tools 20, as shown in FIG. 1, such as a tethered drone or tool string attached to wireline cable 24, would not be available to an untethered drone 10. In an embodiment and as shown in FIG. 2A, components of the drone 10 may be supplied with electrical power by the power supply 492. The power supply 492 may occupy any portion of the drone 10, i.e., one or more of the body 52, head 58 or tail 60. It is contemplated that the power supply 492 may be disposed so that it is adjacent components of the drone 10 that require electrical power.

An on-board power supply 492 for a drone 10 may take the form of an electrical battery; the battery may be a primary battery or a rechargeable battery. Whether the power supply 492 is a primary or rechargeable battery, it may be inserted into the drone at any point during construction of the drone 10 or immediately prior to insertion of drone 10 into the wellbore 50. If a rechargeable battery is used, it may be beneficial to charge the battery immediately prior to insertion of the drone 10 into the wellbore 50. Charge times for rechargeable batteries are typically on the order of minutes to hours.

In an embodiment, another option for power supply 492 is the use of a capacitor or a supercapacitor. A capacitor is an electrical component that consists of a pair of conductors separated by a dielectric. When an electric potential is placed across the plates of the capacitor, electrical current enters the capacitor, the dielectric stops the flow from passing from one plate to the other plate and a charge builds up. The charge of a capacitor is stored as an electric field between the plates. Each capacitor is designed to have a particular capacitance (energy storage). In the event that the capacitance of a chosen capacitor is insufficient, a plurality of capacitors may be used. When the capacitor is connected to a circuit, a current will flow through the circuit in the same way as a battery. That is, when electrically connected to elements that draw a current the electrical charge stored in the capacitor will flow through the elements. Utilizing a DC/DC converter or similar converter, the voltage outlet by the capacitor will be converted to an applicable operating voltage for the circuit. Charge times for capacitors are on the order of minutes, seconds or even less.

A supercapacitor operates in a similar manner to a capacitor except there is no dielectric between the plates. Instead, there is an electrolyte and a thin insulator such as cardboard or paper between the plates. When a current is introduced to the supercapacitor, ions build up on either side of the insulator to generate a double layer of charge. Although the structure of supercapacitors allows only low voltages to be stored, this limitation is often more than outweighed by the very high capacitance of supercapacitors compared to standard capacitors. That is, supercapacitors are a very attractive option for low voltage/high capacitance applications as will be discussed in greater detail hereinbelow. Charge times for supercapacitors are only slightly greater than for capacitors, i.e., minutes or less.

A battery typically charges and discharges more slowly than a capacitor due to latency associated with the chemical reaction to transfer the chemical energy into electrical energy in a battery. A capacitor is storing electrical energy on the plates so the charging and discharging rate for capacitors are dictated primarily by the conduction capabilities of the capacitors plates. Since conduction rates are typically orders of magnitude faster than chemical reaction rates, charging and discharging a capacitor is significantly faster than charging and discharging a battery. Thus, batteries provide higher energy density for storage while capacitors have more rapid charge and discharge capabilities, i.e., higher power density, and capacitors and supercapacitors may be an alternative to batteries especially in applications where rapid charge/discharge capabilities are desired.

Thus, an on-board power supply 492 for a drone 10 may take the form of a capacitor or a supercapacitor, particularly for rapid charge and discharge capabilities. A capacitor may also be used to provide additional flexibility regarding when the power supply is inserted into the drone 10. This flexibility stems from the fact that the capacitor will not provide power until it is charged. Thus, shipping and handling of a drone 10 containing shaped charges 62 or other explosive materials presents low risks where an uncharged capacitor is installed as the power supply 492. This is contrasted with shipping and handling of a drone 10 with a battery, which can be an inherently high-risk activity and frequently requires a separate safety mechanism to prevent accidental detonation. Further, and as discussed previously, the act of charging a capacitor is very fast. Thus, the capacitor or supercapacitor being used as a power supply 492 for drone 10 can be charged immediately prior to deployment of the drone 10 into the wellbore 50.

In an embodiment, electrical components like the computer/processor 80, the navigational sensors 82 and the other electronic components 84 may be battery powered while explosive elements like a detonator for initiating detonation of the shaped charges 62 are capacitor powered. Such an arrangement would take advantage of the possibility that some or all of the computer/processor 80, the navigational sensors 82 and the other electronic components 84 may benefit from a high density power supply having higher energy density, i.e., a battery, while initiating elements such as detonators typically benefit from a higher power density, i.e., capacitor/supercapacitor. A very important benefit for such an arrangement is that the battery is completely separate from the explosive materials, affording the potential to ship the drone 10 preloaded with a charged or uncharged battery. The power supply that is connected to the explosive materials, i.e., the capacitor/supercapacitor, may be very quickly charged immediately prior to dropping drone 10 into wellbore 50, e.g., by electrical connection 180 when drone 10 is present in the drone compartment 152 of the wellhead launcher 400. Alternatively, electrical connections with the drone may be present in magazine 100. Thus, the charging and programming of each drone may also be accomplished in the magazine 100.

FIGS. 12-15 illustrate an embodiment of the drone manipulating arm 40 and platform 44 mounted on the moveable cart 352 wherein the drone magazine 100 includes a portable magazine 380. The portable magazine 380 may be mounted on a magazine platform 390, best seen in FIG. 16, that is either supported by the same moveable cart 352 supporting the drone manipulating arm 40 or a secondary moveable cart that may accompany the moveable cart 352. The secondary moveable cart and the moveable cart 352 may be attached to one another and move in concert or may be independent from one another and placed proximate each other when required. According to an aspect, the portable magazine 380 contains a plurality of drones 10 that may be organized by type. For example, a first group of drones 104 may be of one type/configuration and a second group of drones 106 may be of a different type/configuration.

The portable magazine 380 may include a portable magazine cover 382 that may be closed to protect the drones 10 and the interior of the portable magazine 380. The portable magazine cover 382 may also include a plurality of drone connectors 386, one for each drone 10, that allow electrical connection between the portable magazine 380 and each drone 10 contained therein. As illustrated, the drone connectors 386 may be located on the underside of the magazine cover 382. Alternatively, the drone connectors 386 may be located in the bottom of the portable magazine 380 to contact the opposite end of each drone 10. It is contemplated that the drone connectors 386 may be arranged to contact the side of the drones 10. In the event that the drone 10 contains a power supply 492 and/or an onboard computer 490, the electrical connection 386 may provide either or both of the charging power and the instructions to the drone 10. The electrical connection 386 may also be used to remove charge from the power supply 492. That is, closing the cover to store the drones 10 will cause at least some of the charge in the power supply 492 to be removed. In the event that the power supply is a capacitor or supercapacitor, closing the cover in preparation to store the drones 10 for later use will discharge some or all of the charge on the capacitor. Further, data may be collected from the electronics of the drone 10 through the drone connectors 386 to assess its identity and current status, e.g., current instructions.

The portable magazine 380 may also include a magazine connector 388 for establishing an electrical connection with the electronics and/or electronic connectors inside the portable magazine 380. The magazine connector 388 may include a plug-type connector, a flat electrical contact or a magnetic electrical contact. The magazine connector 388 may be located essentially anywhere on the surface of the portable magazine 380. Either or both charging power and computer signals may be passed through magazine connector 388 to and from drones 10 contained in the portable magazine 380. The source of the charge/signals provided to the magazine connector 388 may be onboard the moveable cart 352 or a secondary moveable cart. Alternatively, the charge/signals source may be centrally located such that the charge/information is provided to the drones 10 in a central repository for portable magazines 380 or prior to the moveable cart 352 departing an area.

Figure 14:
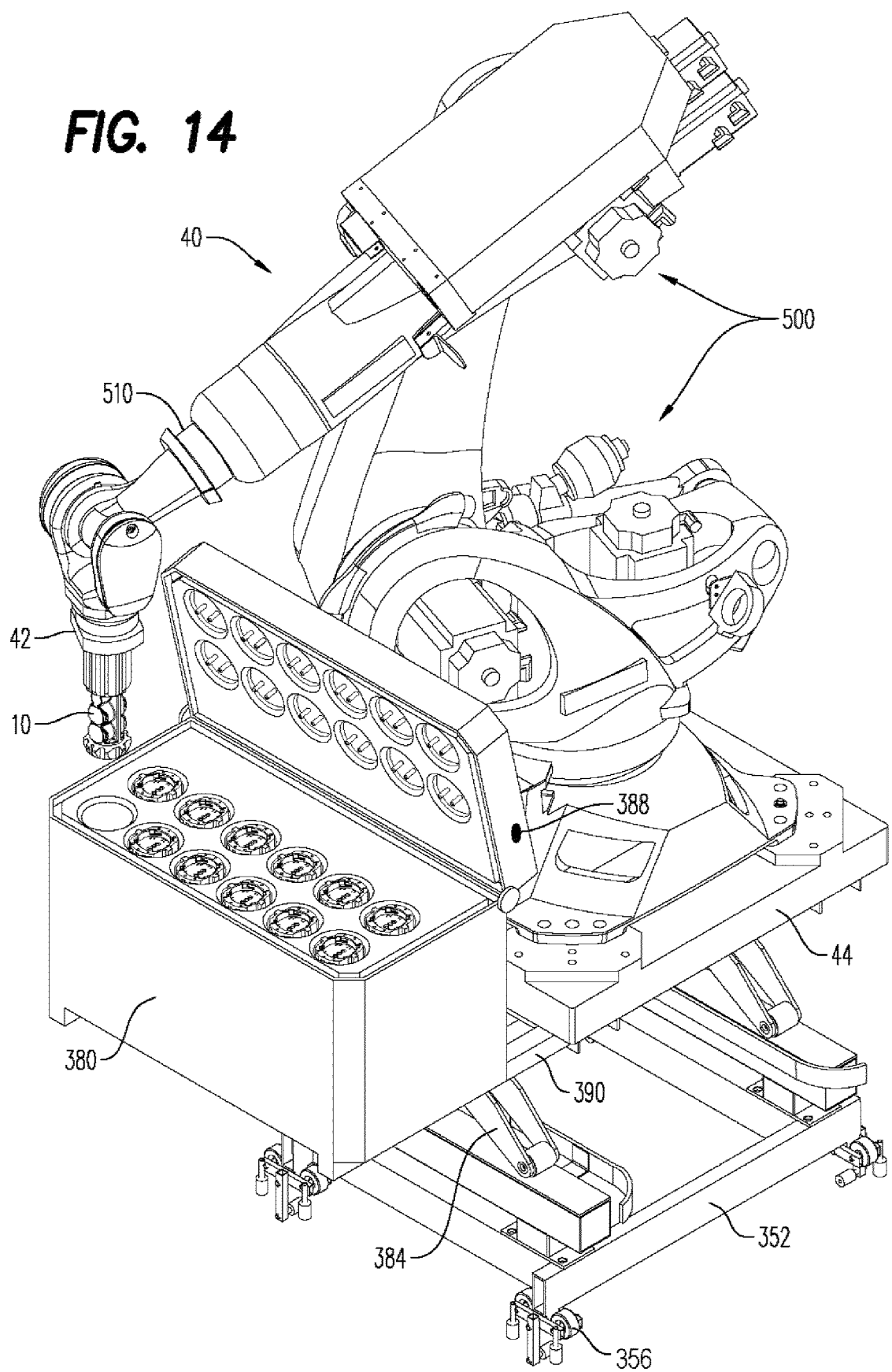
FIG. 14 is a side, perspective view of the embodiment of FIG. 12 where the drone manipulating arm has withdrawn the drone from the portable magazine.
Figure 15:
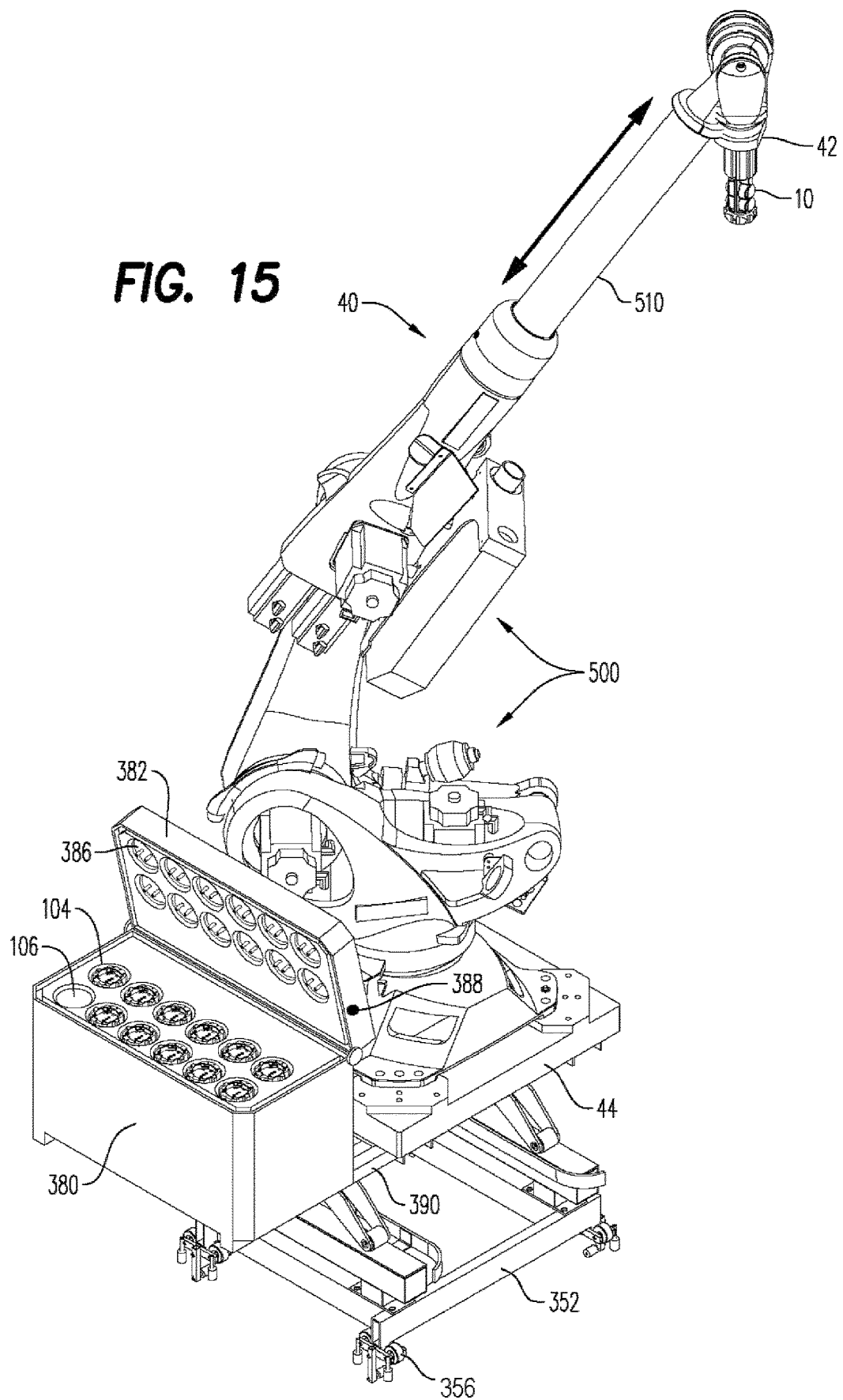
FIG. 15 is a side, perspective view of the embodiment of FIG. 12 where the drone manipulating arm has moved the drone to a position from which it may be inserted into the wellhead receiver.
Figure 16:
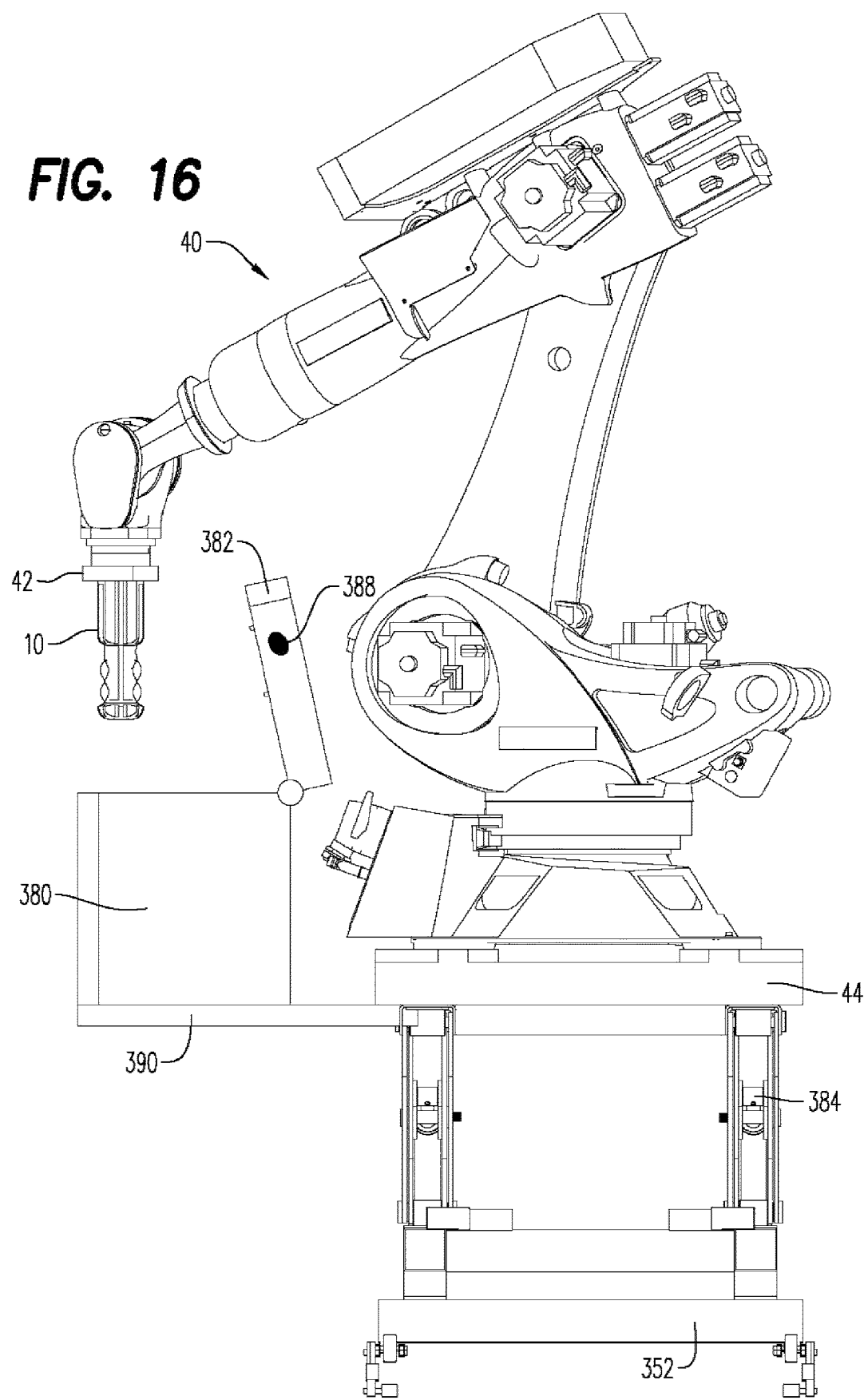
FIG. 16 is a side, plan view of the embodiment of FIG. 14, illustrating a magazine platform, a scissor lift and a moveable cart.

In operation, the drones 10 inside the portable magazine may be provided with electrical charge and instructions through the magazine connector 388 and the drone connectors 386. If not already loaded, one or more portable magazines 380 may be loaded onto the magazine platform of the moveable cart 352 or a secondary moveable cart. The moveable cart 352, secondary moveable cart, the drone manipulating arm 40 and the portable magazine(s) 380 may be moved to a point within reach of any one of a number of wellhead receivers 400a, 400b, 400c, 400d. Once adjacent the selected wellhead receiver 400, the drone manipulating arm 40 engages its drone engagement element 42 with the selected drone 10, as illustrated in, for example, FIGS. 13-16. The drone manipulating arm 40 removes the selected drone 10 from the portable magazine 380 and, as illustrated in FIGS. 14 and 15, lifts the drone 10 so that the drone 10 can be move to the top of wellhead receiver 400 such that the drone 10 may be inserted into the drone compartment entrance 154 (as seen, for example, in FIG. 6). At any point, the height of the automated arm platform 44 may be adjusted by a mechanism associated with the moveable cart 352. For example, a scissor lift 384 may be used to increase the height of the drone manipulating arm 40 such that the drone compartment entrance 154 is accessible. The portable magazine(s) 380 may also be lifted if the magazine platform 390 is separate from the automated arm platform 44. In any embodiment presented herein, the scissor lift 384 may be utilized, among other functions, to reduce the required size of the drone manipulating arm 40 required to reach a given height of wellhead receiver 400.

Figure 17:
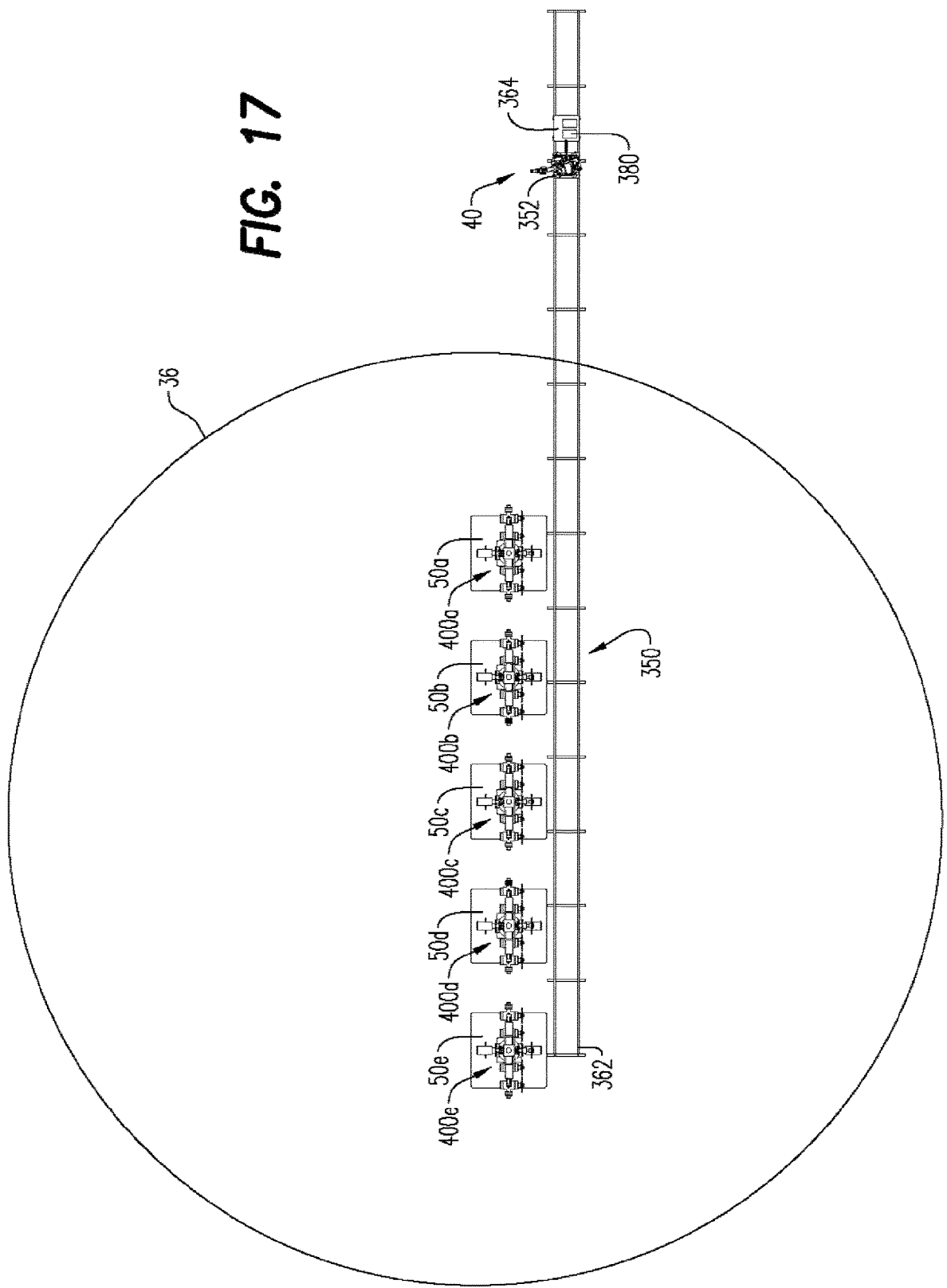
FIG. 17 is a top, plan view of a system similar to that of FIG. 8 which also illustrates an embodiment of a separate cart for one or more magazines.

FIG. 17 illustrates an embodiment where the portable magazines 380 occupy a separate magazine cart 364 that is connected to moveable cart 352. The magazines 100 or portable magazines 380 may, thus, accompany the drone manipulating arm 40 mounted on moveable cart 352. If automated, the moveable cart 352 and magazine cart 364 may thus move into the red zone 36 and enable minimal human presence in the red zone 36. As with the various embodiments of the drone manipulating arm 40 described hereinabove, the platform 44 and arm 40 may be mounted onto a scissors lift mechanism 384, to further help enable the drone manipulating arm 40 to access wellhead receivers 400 that might otherwise be too high.

Whether the embodiment of FIG. 17 or any other embodiment that is able to use automation to control the drone manipulating arm 40, visual feedback of the status of the drone manipulating arm and magazines 100/380 may be of high utility. Other such embodiments include those of FIGS. 6-11. This visual feedback may be provided by video cameras mounted on any or all of the drone manipulating arm, the magazines 100/380, the platforms 44/390 or any structure of the various carts. Additional sensors, other than cameras, may also be utilized.

Figure 18:
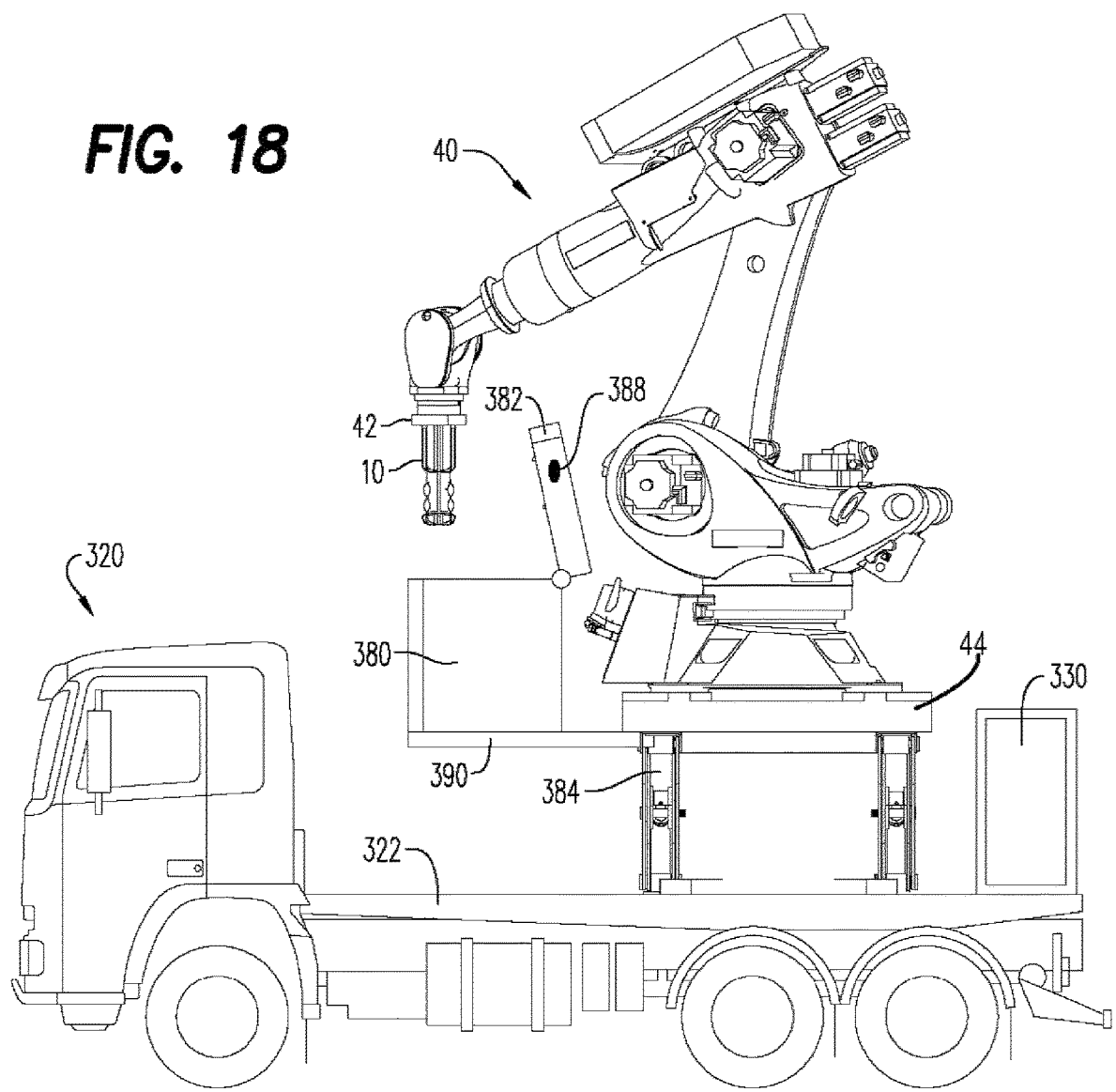
FIG. 18 is a side, plan view of an embodiment of the drone manipulating arm mounted on the flatbed of a truck.

FIG. 18 illustrates an embodiment that utilizes a flatbed 322 of a truck 320 as a platform. According to an aspect, the truck 320 and flatbed 322 may be integral. The truck 320 may be in the form of a semi-trailer that is detachable from the flatbed 322. The large amount of space available on a typical flatbed 322 permits a number of options to accompany a drone manipulating arm 40. For example, several magazines 100 and/or portable magazines 380 may be carried by the flatbed 322. In addition, a power generator 330 may also be included on the flatbed 322. The power generator 330 may provide power to the manipulating arm 40 and, if appropriate, the magazine 100 or portable magazine 380, as well as any other component or device of the wellbore deployment system that requires power. It is contemplated that the power generator 330 may be utilized with any of the embodiments described herein. For example, the power generator 330 may share a moveable cart 352 with a drone manipulating arm 40, share the magazine cart 364 with the magazines or have its own cart.

In an embodiment, a rail system may also be disposed on and extend from the truck flatbed 322. The flatbed 322 will cause the rail system to be elevated in relation to the ground surface. The rail system may include foldable/collapsible rails with short sections connected by links or joints that can be used to fold and/or collapse the rails.

In an embodiment, the drone manipulating arm 40, magazines 100, portable magazines 380 and, if present, power generator 330 may each be directly supported by the flatbed 322. Alternatively, as seen in FIG. 18, the drone manipulating arm 40 may be mounted on a platform 44 attached to a scissor lift 384, thus allowing the drone manipulating arm 40 to access wellhead receivers 400 that might be out of reach without the lift 384. The magazine 100 or the portable drone magazine 380 may be supported by the flatbed 322 or have its magazine platform 390 engaged with the scissor lift 384. Magazines 100/382 may be loaded onto and/or moved on the flatbed 322 by a forklift. Depending upon available space in or on the truck 320 and flatbed 322, an additional drone manipulating arm 40 may be carried. The additional manipulating arm 40 is likely to be use as a spare manipulating arm 40.

In an embodiment, some protection from weather, etc., may be included. For example, the embodiment of FIG. 18 may have a cargo container ("c-container") disposed on the semi-trailer and containing all of the required elements. The top of the c-container may be designed to be removed/retracted in use. A removed/retracted top permits drone manipulating arm 40 to be utilized in bringing the drone 10 from magazine 100/380 to wellhead receiver 400.

A control unit may be provided in combination with any of the embodiments described herein. If used in combination with the embodiment of FIG. 18, the control unit may be integrated with the truck 320 or be disposed on the flatbed 322. The cameras and other sensors presented above will supply data to the control unit. The control unit can be programmed to accomplish essentially any function, including operation of the drone manipulating arm 40 and movement of any of the carts.

The present disclosure, in various embodiments, configurations and aspects, includes components, methods, processes, systems and/or apparatus substantially developed as depicted and described herein, including various embodiments, sub-combinations, and subsets thereof. Those of skill in the art will understand how to make and use the present disclosure after understanding the present disclosure. The present disclosure, in various embodiments, configurations and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

In this specification and the claims that follow, reference will be made to a number of terms that have the following meanings. The terms "a" (or "an") and "the" refer to one or more of that entity, thereby including plural referents unless the context clearly dictates otherwise. As such, the terms "a" (or "an"), "one or more" and "at least one" can be used interchangeably herein. Furthermore, references to "one embodiment", "some embodiments", "an embodiment" and the like are not intended to be interpreted as excluding the existence of additional embodiments that also incorporate the recited features. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Terms such as "first," "second," "upper," "lower" etc. are used to identify one element from another, and unless otherwise specified are not meant to refer to a particular order or number of elements.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

As used in the claims, the word "comprises" and its grammatical variants logically also subtend and include phrases of varying and differing extent such as for example, but not limited thereto, "consisting essentially of" and "consisting of" Where necessary, ranges have been supplied, and those ranges are inclusive of all sub-ranges therebetween. It is to be expected that variations in these ranges will suggest themselves to a practitioner having ordinary skill in the art and, where not already dedicated to the public, the appended claims should cover those variations.

The terms "determine", "calculate" and "compute," and variations thereof, as used herein, are used interchangeably and include any type of methodology, process, mathematical operation or technique.

The foregoing discussion of the present disclosure has been presented for purposes of illustration and description. The foregoing is not intended to limit the present disclosure to the form or forms disclosed herein. In the foregoing Detailed Description for example, various features of the present disclosure are grouped together in one or more embodiments, configurations, or aspects for the purpose of streamlining the disclosure. The features of the embodiments, configurations, or aspects of the present disclosure may be combined in alternate embodiments, configurations, or aspects other than those discussed above. This method of disclosure is not to be interpreted as reflecting an intention that the present disclosure requires more features than are expressly recited in each claim. Rather, as the following claims reflect, the claimed features lie in less than all features of a single foregoing disclosed embodiment, configuration, or aspect. Thus, the following claims are hereby incorporated into this Detailed Description, with each claim standing on its own as a separate embodiment of the present disclosure.

Advances in science and technology may make equivalents and substitutions possible that are not now contemplated by reason of the imprecision of language; these variations should be covered by the appended claims. This written description uses examples to disclose the method, machine and computer-readable medium, including the best mode, and also to enable any person of ordinary skill in the art to practice these, including making and using any devices or systems and performing any incorporated methods. The patentable scope thereof is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A drone delivery system comprising:
   a drone magazine configured to contain a plurality of drones;
   a drone manipulating arm including a drone engagement element configured to connect and disconnect the drone manipulating arm to and from a selected drone of the plurality of drones, wherein the drone manipulating arm is configured to remove the selected drone from the drone magazine and move the selected drone from the drone magazine to a wellhead connected to a wellbore; and
   a wellhead receiver connected to the wellhead, wherein the wellhead receiver comprises
   a drone compartment, and
   a drone compartment entrance in communication with the drone compartment,
   wherein the drone manipulating arm is configured to deposit the drone through the drone compartment entrance into the drone compartment.

2. The drone delivery system of claim 1, wherein the wellhead receiver is configured to receive the drone from the drone manipulating arm and prepare the selected drone for deposit into the wellbore.

3. The drone delivery system of claim 2, further comprising:
   a wellhead receiver valve disposed adjacent the drone compartment entrance, the wellhead receiver valve being configured to seal and maintain a set of conditions in the drone compartment, wherein the set of conditions in the drone compartment is different from a set of conditions outside the drone compartment; and a launcher valve disposed between the wellhead receiver and the wellhead, wherein the launcher valve is configured to seal the drone compartment from the wellbore.

4. The drone delivery system of claim 1, further wherein the wellhead receiver is configured to subject the selected drone to approximately a set of conditions in the wellbore, wherein the set of conditions in the wellbore comprise a pressurized fluid.

5. The drone delivery system of claim 1, wherein the drone magazine comprises:

a magazine frame configured to contain a first group of the plurality of drones arranged in a first section of the magazine frame and a second group of the plurality of drones arranged in a second section of the magazine frame, wherein the drone magazine is configured to permit removal of the plurality of drones by the manipulating arm from at least one of the first group and the second group.

6. The drone delivery system of claim 1, wherein the drone magazine is a first drone magazine, and the drone delivery system further comprises:

an alternative drone magazine configured to contain an alternative plurality of drones, wherein the manipulating arm alternates between the removal of the plurality of drones from the first drone magazine and the alternate plurality of drone from the alternative drone magazine.

7. The drone delivery system of claim 1, further comprising:

a platform supporting the drone manipulating arm; and a moveable cart configured to support the platform and the drone manipulating arm, the moveable cart being configured to permit movement of the platform and the manipulating arm relative to the wellbore, wherein the platform and the manipulating arm may be moved from a first position from which the wellbore is accessible by the manipulating arm to a second position from which an alternate wellbore is accessible by the manipulating arm and the wellbore is not accessible by the manipulating arm.

8. The drone delivery system of claim 7, wherein the moveable cart further comprises:

a movement apparatus configured to permit movement of the moveable cart relative to the wellbore, wherein the movement apparatus comprises at least one of a wheel, a bearing, a magnetic levitation system, a conveyor system, a slide rail system and a flexible cable-track system.

9. The drone delivery system of claim 8, further comprising:

a magazine cart configured for transporting the drone magazine, the magazine cart being configured to move the drone magazine relative to the wellbore.

10. The drone delivery system of claim 7, further comprising:

a rail system including one or more rails, wherein the moveable cart comprises a rail engagement element attached to the moveable cart, the rail engagement element of the moveable cart is configured to engage the one or more rails of the rail system such that the moveable cart carries the manipulating arm along the rail system from adjacent the drone magazine to the first position, and the wellbore is accessible by the manipulating arm at the first position.

11. A drone delivery system comprising:

a drone magazine configured to contain a plurality of drones;

a drone manipulating arm comprising a drone engagement element, wherein the drone manipulating arm is configured to select a drone from the plurality of drones and position the selected drone for insertion into a wellhead receiver connected to a first wellbore, the wellhead receiver including a drone compartment and a drone compartment entrance, and deposit the selected drone through the drone compartment entrance into the drone compartment;

a platform configured to support the drone manipulating arm; and a moveable cart supporting the platform and the drone manipulating arm, the moveable cart being configured to permit movement of the platform and the manipulating arm relative to the first wellbore, wherein the platform and the manipulating arm are configured to be moved from a first position to a second position.

12. The drone delivery system of claim 11, wherein the first position is a position from which the first wellbore may be accessed by the manipulating arm, and the second position is a position from which an alternate wellbore may be accessed by the manipulating arm and the first wellbore cannot be accessed by the manipulating arm.

13. The drone delivery system of claim 11, wherein the moveable cart further comprising a movement apparatus comprising at least one of a wheel, a bearing, a magnetic levitation system, a conveyor system, a slide rail system and a flexible cable-track system, wherein the movement apparatus is configured to permit movement of the moveable cart relative to the wellbore.

14. The drone delivery system of claim 11, further comprising:

a rail system comprising one or more rails, wherein the moveable cart further comprises a rail engagement element attached to a cart body, wherein the rail engagement element of the moveable cart is configured to engage the one or more rails of the rail system such that the moveable cart carries the manipulating arm along the rail system from a first position to a second position, wherein in the first position the first wellbore is accessible by the manipulating arm and in the second position an alternate wellbore is only accessible by the manipulating arm.

15. The drone delivery system of claim 14, wherein the rail engagement element comprises a wheel, a bearing, a magnetic levitation system, a conveyor system, a slide rail and a flexible cable-track system.

16. A method for conveying a drone into a wellbore, the method comprising:

defining a red zone that represents an area of unacceptable safety for an untrained person around the wellbore, selecting a drone from a drone magazine containing a plurality of drones, wherein the drone magazine is located outside the red zone prior to the step of selecting the drone from the drone magazine containing the plurality of drones;

engaging the selected drone with a drone engagement element of a drone manipulating arm;

removing the selected drone from the drone magazine; and placing the selected drone into a wellhead receiver connected to the wellbore.

17. The method of claim 16, wherein the drone magazine is positioned on a moveable cart configured to support the drone manipulating arm and to permit movement of the manipulating arm relative to the wellbore, the method comprising:

moving the moveable cart and manipulating arm from a first position adjacent the wellbore to a second position adjacent an alternate wellbore.

18. The method of claim 17, wherein the moveable cart comprises a plurality of rail engagement elements in engagement with one or more rails of a rail system, the method further comprising:

positioning the moveable cart on the one or more rails of the rail system;

moving the manipulating arm along a length of the rail system; and moving the drone from a first position to a second position, the first position being spaced apart from the wellhead receiver and the second position being adjacent the wellhead receiver.

19. The method of claim 16, wherein the drone magazine comprises a magazine frame configured to contain a first group of the plurality of drones in a first section of the magazine frame and contain a second group of the plurality of drones arranged in a second section of the magazine frame, the method further comprising:

alternating between the first group and the second group to select a drone from the drone magazine prior to the step of engaging the selected drone with the drone manipulating arm.

\* \* \* \* \*